US012208976B2

(12) United States Patent
Archer et al.

(10) Patent No.: US 12,208,976 B2
(45) Date of Patent: *Jan. 28, 2025

(54) NEST ASSEMBLY FOR A BLISTER PACKAGE STACKER

(71) Applicant: REMEDI TECHNOLOGY HOLDINGS, LLC, Towson, MD (US)

(72) Inventors: Bobby Owen Archer, Lebanon, MO (US); Bruce Scott Dunn, Springboro, OH (US); Jan Bohlmann, White Hall, MD (US)

(73) Assignee: REMEDI TECHNOLOGY HOLDINGS, LLC, Towson, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,255

(22) Filed: Aug. 25, 2022

(65) Prior Publication Data
US 2022/0411209 A1 Dec. 29, 2022

Related U.S. Application Data

(63) Continuation of application No. 16/680,151, filed on Nov. 11, 2019, now Pat. No. 11,440,749, which is a
(Continued)

(51) Int. Cl.
B65G 57/30 (2006.01)
B65B 35/52 (2006.01)

(52) U.S. Cl.
CPC ............ B65G 57/305 (2013.01); B65B 35/52 (2013.01); B65G 57/302 (2013.01); B65H 2301/42122 (2013.01)

(58) Field of Classification Search
CPC ................ B65G 57/302; B65G 59/062; B65H 2301/42122; B65H 31/26; B65H 33/06
See application file for complete search history.

(56) References Cited

U.S. PATENT DOCUMENTS 1,920,762 A 8/1933 Neff
2,658,010 A 10/1958 Adams
(Continued)

FOREIGN PATENT DOCUMENTS

CN 1429166 A 7/2003
CN 1950259 A 4/2007
(Continued)

OTHER PUBLICATIONS

Office Action issued Oct. 1, 2022, in corresponding Korean Patent Application No. 10-2019-7024937 (with English Translation), 15 pages.
(Continued)

Primary Examiner — Gregory W Adams
(74) Attorney, Agent, or Firm — Oblon, McClelland, Maier & Neustadt, L.L.P.

(57) ABSTRACT

A blister collation system includes a blister packager with a blister seal station which seals a blister package with a medicament inside and a blister package stacker connected to the blister packager via a conveyor which moves individual blister packages. The blister package stacker has a nest inlet for reception of the blister packages from the conveyor, a nest assembly for holding one of the blister packages, and a first blister package collection tower for storing a stack of the blister packages. The nest assembly is configured to insert one blister package at a time upward into a bottom of the first collection tower. The stacker further has a tower gate holding the inserted blister packages and a mechanism for pushing the stack of the blister packages from the first collection tower into a storage container.

21 Claims, 20 Drawing Sheets

Related U.S. Application Data continuation of application No. 15/882,834, filed on Jan. 29, 2018, now Pat. No. 10,501,272.

(60) Provisional application No. 62/451,417, filed on Jan. 27, 2017, provisional application No. 62/517,234, filed on Jun. 9, 2017.

(56) References Cited

U.S. PATENT DOCUMENTS

| | | | |
|---|---|---|---|
| 3,758,122 A * | 9/1973 | Kawaharasaki | G11B 15/6885 360/92.1 |
| 3,890,764 A | 6/1975 | Hartman | |
| 3,938,675 A | 2/1976 | Rees | |
| 4,537,550 A * | 8/1985 | Mojden | B65G 1/133 414/794.9 |
| 4,676,708 A | 6/1987 | Mojden | |
| 4,955,783 A | 9/1990 | Grazia | |
| 5,081,816 A * | 1/1992 | Cardinali | B65B 61/20 53/157 |
| 5,299,907 A | 4/1994 | Dal Pozzo | |
| 5,415,519 A | 5/1995 | Lee | |
| 5,880,443 A * | 3/1999 | McDonald | G07F 11/64 414/280 |
| 6,523,330 B1 * | 2/2003 | Hurd | B65C 3/08 53/529 |
| 6,675,553 B2 * | 1/2004 | Lohrey | B65B 35/52 53/247 |
| 8,602,715 B2 * | 12/2013 | Schoeppe | G01N 35/028 221/11 |
| 10,501,272 B2 * | 12/2019 | Archer | B65B 35/52 |
| 2008/0110134 A1 | 5/2008 | Nitulescu et al. | |
| 2009/0220687 A1 | 9/2009 | Marks et al. | |
| 2010/0038210 A1 * | 2/2010 | Cox | B65G 23/26 198/460.1 |
| 2010/0172724 A1 * | 7/2010 | Hawkes | B65G 1/06 414/807 |
| 2010/0175352 A1 | 7/2010 | Soloman | |
| 2012/0057957 A1 | 3/2012 | Schoeppe et al. | |

FOREIGN PATENT DOCUMENTS

| | | |
|---|---|---|
| CN | 101128177 A | 2/2008 |
| CN | 104554844 A | 4/2015 |
| CN | 204399539 U | 6/2015 |
| DE | 10 2011 100421 | 11/2012 |
| EP | 0 337 958 | 10/1989 |
| EP | 0 485 437 A1 | 1/1992 |
| JP | 59064422 A | 4/1984 |
| JP | 60228328 A | 11/1985 |
| JP | 2015 013671 | 1/2015 |
| KR | 10-2011-0121606 A | 11/2011 |

OTHER PUBLICATIONS

Combined Chinese Office Action and Search Report issued Sep. 22, 2022 in Chinese Patent Application No. 202111039879.7 (with unedited computer generated English translation)., 13 pages.

International Search Report and the Written Opinion of the International Searching Authority mailed on Apr. 23, 2018, in PCT/US2018/015773, filed on Jan. 29, 2018.

Australian Examination Report issued on Apr. 27, 2020. in Patent Application No. 2018212978, 3 pages.

Brazilian Office Action issued Jul. 14, 2020 in Brazilian Patent Application No. BR112019015526-0 (with English language translation), 13 pages.

Combined Chinese Office Action and Search Report Issued Nov. 2. 2020 in Patent Application No. 201880018010.4 (with English machine translation and English translation of Category of Cited Documents), 12 pages.

Extended Europeen Search Report issued May 31, 2021 in European Patent Application No. 21159916.2, 6 pages.

* cited by examiner

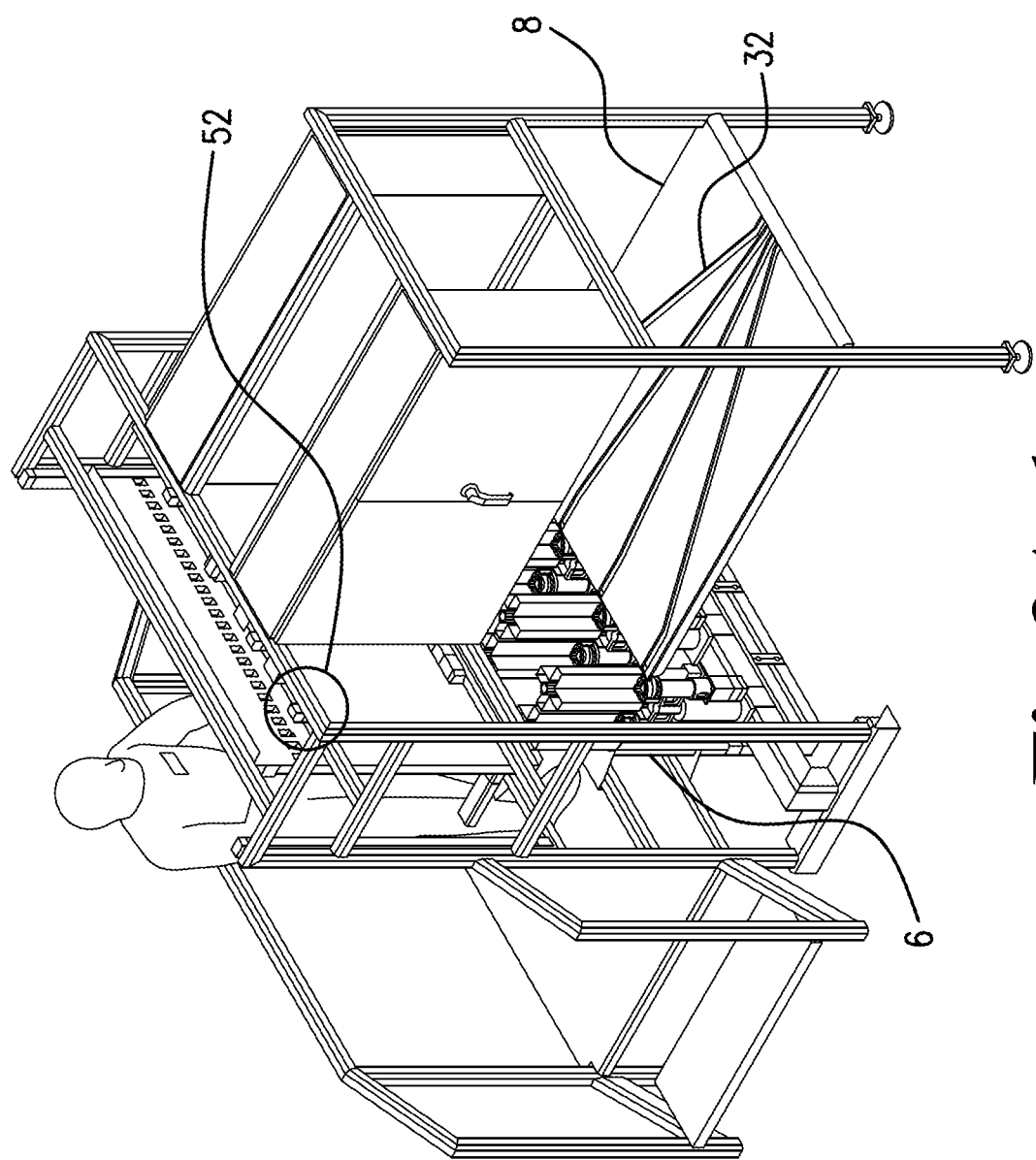

NEST ASSEMBLY FOR A BLISTER PACKAGE STACKER

CROSS REFERENCE TO RELATED APPLICATIONS

This application is a continuation of U.S. Ser. No. 16/680,151, filed Nov. 11, 2009) (pending), which is a continuation of U.S. Ser. No. 15/882,834, filed Jan. 29, 2018 (patented), and claims benefit of U.S. Provisional Application Ser. No. 62/451,417 filed Jan. 27, 2017, entitled "BLISTER PACKAGER AND STACKER" and U.S. Provisional Application Ser. No. 62/517,234 filed Jun. 9, 2017, entitled "BLISTER PACKAGER AND STACKER." The entire contents of each of the above applications are incorporated herein by reference.

BACKGROUND

Field

The present invention is related to automated pill handling and packaging devices.

Description of the Related Art

Hospitals, long term care and other health care facilities distribute and administer pharmaceutical products to patients in individual doses numerous times per day. Pharmaceutical products such as prescription medications, nutritional supplements and the like are often stored in bulk by pharmacies and are packaged into containers of multiple doses based on individual prescriptions for retail or outpatient distribution. For inpatient or in-facility distribution, pharmacies also often package bulk pharmaceuticals into "unit of use" or "unit dose" packages, for example, multiple blister packs that are connected together in a strip that contain multiple single doses of the pharmaceutical product.

In the art, blister packages are known for holding medicaments for dispensing to a patient. A blister package as described in U.S. Pat. No. 5,954,204 (the entire contents of which are incorporated herein by reference) is formed of a rupturable substrate, a blister layer formed over the rupturable substrate, and a medicament contained between the blister layer and the rupturable substrate. The blister package can be opened and gives access to the medicament by deforming the blister layer so that it punctures the rupturable substrate and allows the medicament to be removed therefrom, without applying directly a mechanical pressure on the medicament.

U.S. Pat. No. 9,394,070 (the entire contents of which are incorporated herein by reference) describes a system for packaging unit doses of medication. This system included a feeding assembly, a pill packaging assembly, and a pill guide. In this system, a pill traveling through a pill guide would exit an outlet aperture oriented such that a leading edge of the pill would point toward one side of the pill package and the trailing edge of the pill would be inclined toward an opposite side of the pill package.

US Pat. Appl. Publ. No. 2010/0175352 (the entire contents of which are incorporated herein by reference) describes an automated packaging apparatus utilizing a rotating assembly of elongated slats containing cavities to receive discrete pharmaceutical, vitamin, or food products. Quantities of discrete products such as tablets, capsules, or gels were deposited into the hopper of the apparatus. The apparatus then dispensed the discrete products into containers moving on a conveyor system such that each container receives a predetermined quality and quantity of pharmaceutical vitamin, or food products. The '352 apparatus inspected, counted, identified, and analyzed each product deposited into the containers and maintained electronic records describing the status of each product.

US Pat. Appl. Publ. No. 2008/0110134 (the entire contents of which are incorporated herein by reference) describes an apparatus and method for packing pills in cavities formed in a blister web which included a plurality of downwardly directed flexible members, for example brushes, that are continuously cyclically moved to contact and knock down pills that are not properly nested in respective blister cavities.

One traditional method for distributing individual dosage units of pharmaceutical products to patients begins with the generation of a patient order by a physician for particular medications. The patient order is delivered to the pharmacy. There, the process of interpreting the patient order, pulling the specified medication or supplements from the drug storage areas, packaging the medication or supplements, and labeling the package is routinely done manually by pharmacy support personnel. After a final check by the facility pharmacist, the packaged individual dosage units are ready for distribution. In large facilities, the packages containing the patient's order are forwarded to individual nursing units where nursing staffers distribute and administer them to the patients.

There are several disadvantages associated with the traditional method of distributing individual dosage units of pharmaceutical products. To begin with, the process is labor and cost intensive. Many separate labor steps are required to fill a single patient order. In large facilities is servicing hundreds of patients each day, the staffing requirements to rapidly process patient orders are substantial. In addition, with so many human inputs required in the existing process, there may also be a risk of human error.

US Pat. Appl. Publ. No. 2010/0176145 ((the entire contents of which are incorporated herein by reference) describes a dispensing system and associated method that provides a turnkey solution for dispensing pharmaceutical products such as solid medications and nutritional supplements to be taken orally in health care settings, including but not limited to, long term care (LTC) and assisted living settings. The system utilizes modules containing arrays of storage tubes that each contain individually packaged unit dose medications (typically a single pill). In one embodiment, the present inventions relate to an improved system and method for individually packaging unit dose medications or single items and then placing the packaged items into individual storage tubes usable in the system of US Pat. Appl. Publ. No. 2010/0176145.

SUMMARY

In one embodiment of the present invention, there is provided a blister collation system including a blister packager and a blister package stacker. The blister packager includes a blister seal station which seals a blister package with a medicament inside. The blister package stacker is connected to the blister packager via a conveyor which moves and sorts individual blister packages. The blister package stacker has a nest inlet for reception of the blister packages from the conveyor, a nest assembly for holding one of the blister packages, and a blister package collection tower for storing a stack of the blister packages. The nest assembly is configured to insert one blister package at a time upward into a bottom of the blister package collection tower. The blister package stacker has a push arm which pushes the stack of the blister packages from the collection tower into storage tubes.

In one embodiment of the present invention, there is provided a blister package stacker for reception and stacking of blister packages containing medicaments. The blister package stacker has a nest inlet for reception of the blister packages from the conveyor, a nest assembly for holding one of the blister packages, and a blister package collection tower for storing a stack of the blister packages. A blister is inserted in the nest inlet and is raised in one of the nests associated with collection tower sections by rotation of the collection tower which drives the blister upward on a helical cam at the bottom of the collection tower. When the collection tower has completed a 360 degree rotation, the blister is now spaced above the next incoming blister at the nest inlet. The blister package stacker has a push arm which pushes the stack of the blister packages from the collection tower into storage tubes.

In one embodiment of the present invention, there is provided a control system for a blister collation system. The control system includes a non-transitory computer readable medium which, when executed by a processor, performs one or more of the following: receive a first sensor signal indicating that a blister package is loaded on a nest assembly of a blister package stacker, transmits a first control signal to raise the nest assembly into a collection tower, receives a second sensor signal indicating that the collection tower is completely full and transmits a second control signal to push a stack of blister packages into a storage tube, receives a third sensor signal indicating that a conveyor is full of the blister packages and transmits a third control signal to stop production of the blister packages, and receives a fourth sensor signal including information on the medicament in the blister packages and stores the information.

It is to be understood that both the foregoing general description of the inventions and the following detailed description are exemplary, but are not restrictive of the inventions.

BRIEF DESCRIPTION OF TIE DRAWINGS

A more complete appreciation of the inventions and many of the attendant advantages thereof will be readily obtained as the same becomes better understood by reference to the following detailed description when considered in connection with the accompanying drawings, wherein:

FIG. 1A-2 is a schematic depiction of a PVC unwind system of a blister packager;

FIG. 1A-3 is a schematic depiction of a dosing station;

FIG. 2A-1 is a schematic of a conveyor supplying blister packages to a blister stacker;

FIG. 2A-2 is an enlarged view of a section of the conveyor and blister stacker shown in FIG. 2A-1;

DETAILED DESCRIPTION

Figures 1, 1A:
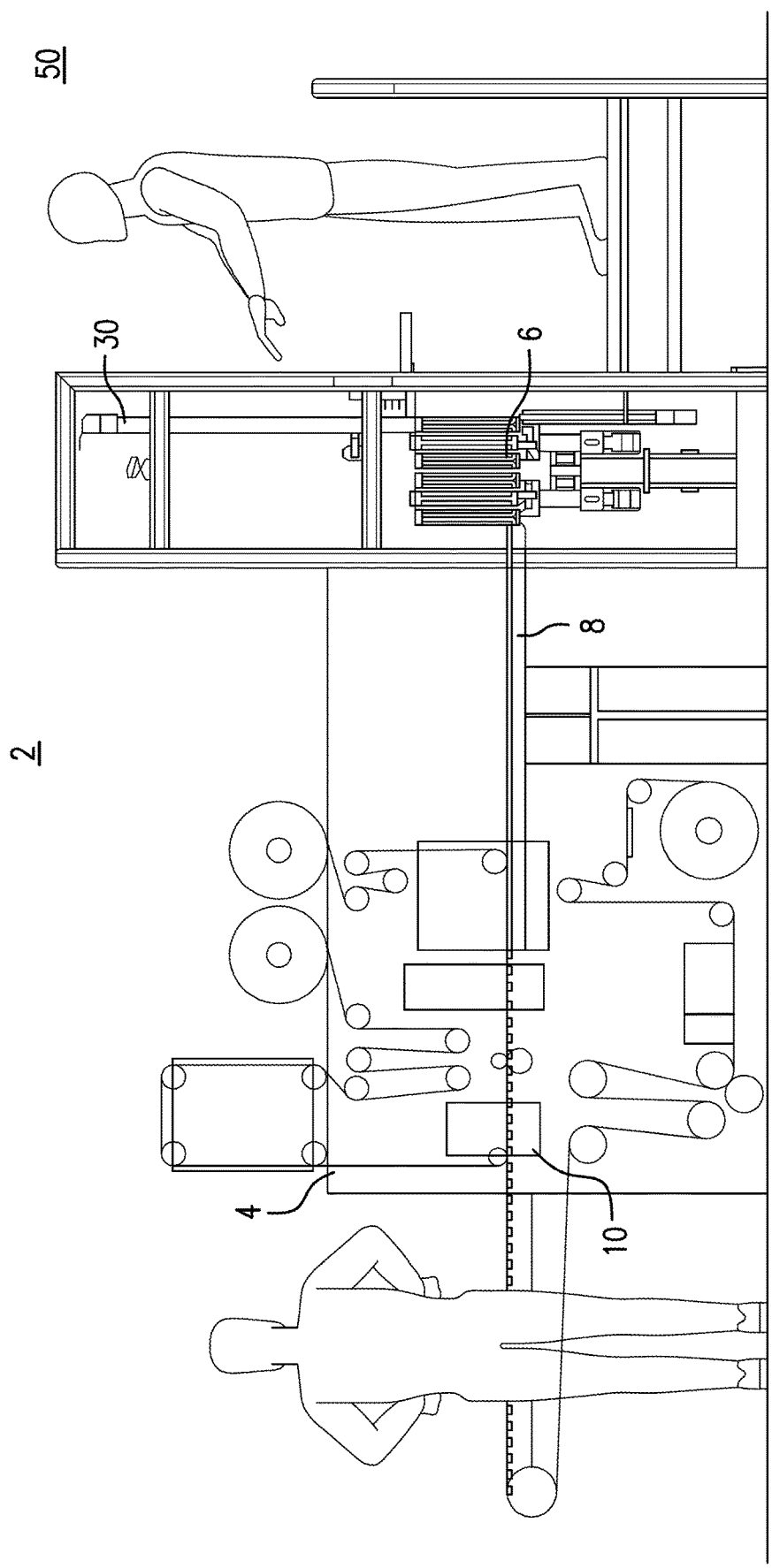
FIG. 1A-1 is a schematic of a blister collation system.

As shown in FIG. 1A-1, in one embodiment the blister-collation system 2 described herein collects blisters 16 from one or more blister packagers 4 (such as for example an Uhlmann BEC 300 packager) and up stacks the blisters by way of a novel blister stacker 6 into plug, and play tubes 30. Plug and play tubes 30 can thereafter be used as a source of blisters 16 in situations where customized pill packs for patients are formed containing the same or different medications as described, for example, in US Pat. Appl. Publ. No. 2010/0176145.

Blister Packager

Figures 1, 1A, 2:
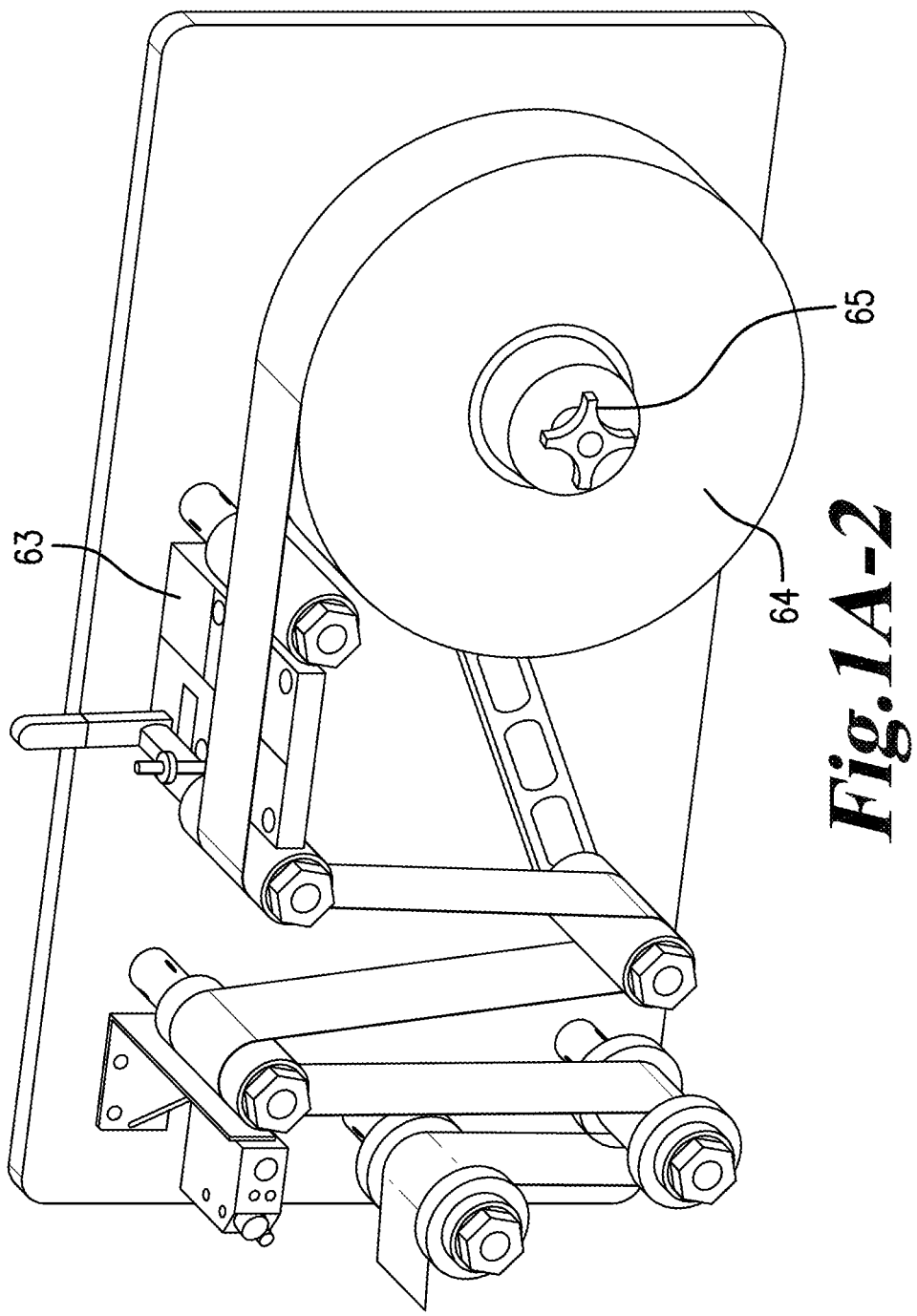
Figures 1, 1A, 2, 3:
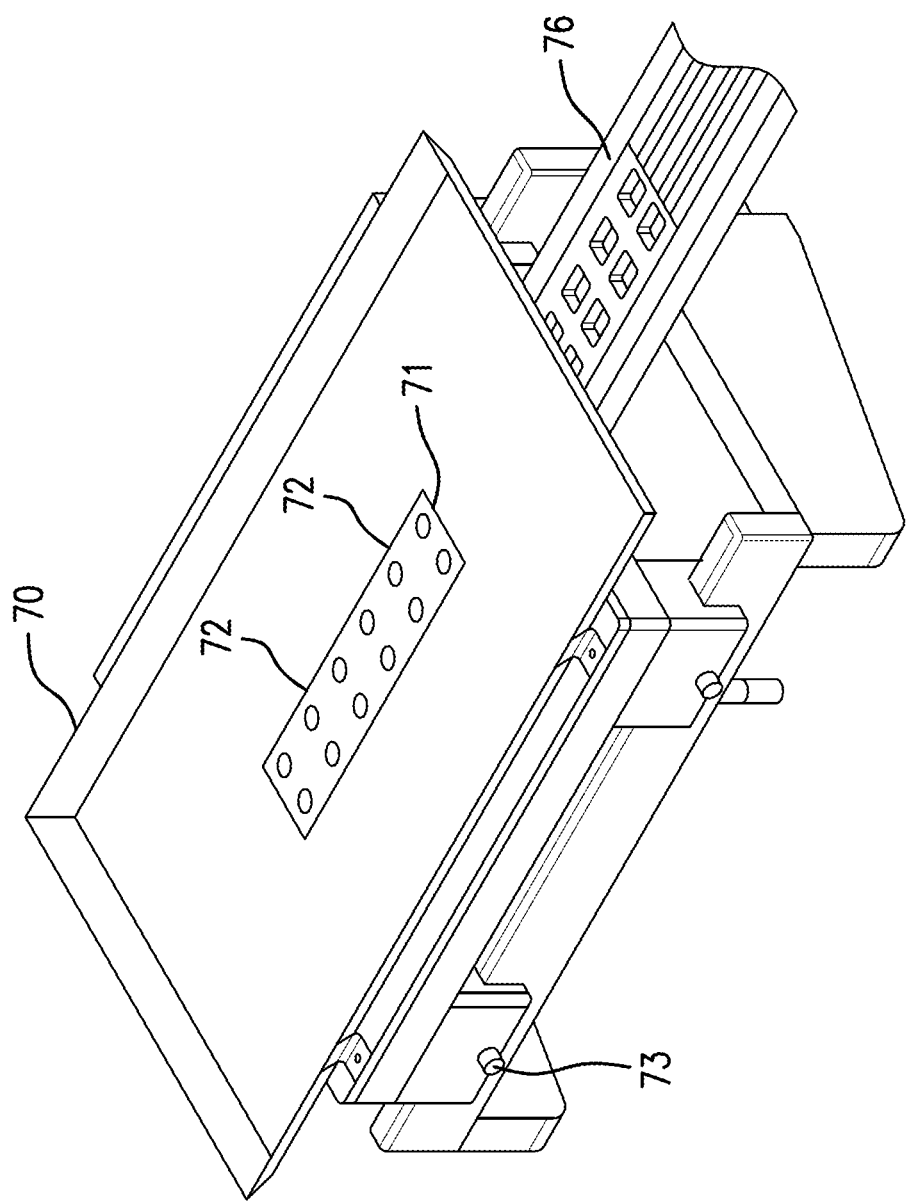

In the blister packager 4, blister material roll 64 shown in FIG. 1A-1 contains for example polyvinyl chloride (PVC) sheet material which is unwound to form one part of the blisters 16. The raw PVC material can be loaded by the operator onto an expanding mandrel. The mandrel can be driven by an electric motor to unwind the material. As shown in FIGS. 1A-1 and 1A-2, the material can be fed through a series of rollers and a dancer arcs A material preheat and blister form station can heat the incoming material to a formable state from which the blisters can be formed. Once the machine indexes the pre-heated material, the tooling can clamp on the material, and the plug assist will push into the material to form a cavity in the materials (i.e., pre-form the blister). The machine will then force air into the cavity to complete the blister cavity where a medication or other item can be placed. Once the forming process is complete, the tooling will open and wait for the system to index.

While the blister packager is particularly suitable for packaging individual solid unit dose medications, nutraceuticals or supplements, in principal any individual item could be packaged in the blisters.

Consistency in the forming station can be improved if interruptions from the packager 4 can be minimized. In one embodiment of the invention, to minimize the interruptions, a servo web feed (disposed after the blister form section) serves as an accumulation dancer. FIG. 1A-2 is a schematic depiction of a PVC unwind system of the blister packager of the invention. Other known thermoformable materials such as PTE and PVD-C could be used instead of PVC if desired.

When an operator filling the blister packages determines that the arrival rate of blister packs to be filled exceeds the filling rate, the operator can interrupt the feed of the blister packs by servo adjustment of the dancer arm 60 adding more path length into the conveyance of the blister packs from the blister pack former to the operator station. This permits the blister pack former to be tolerant of operator interruptions while not interrupting the package cavity forming process discussed above. FIG. 1A-2. The PVC unwind is a low tension process.

In other words, the accumulation dancer arm shown in FIG. 1A-2 permits the blister form station to operate independently of the remaining stations of the blister packager 4. If packager 4 has an interruption, the blister form station shown in FIG. 1A-2A will continue to run and accumulate formed blister sheets with empty cavities in the dancer accumulation area (servo web feed).

In one embodiment of the invention, the dancer has three sensors, one to stop making blisters (accumulation full), and one to start again (accumulation near empty), and one to signal the rest of the machine to start (accumulation empty). Blister load or operator load station is an operator station where the medication is loaded into blister 16. In general, an operator is responsible for loading the correct screen 71 for the medication that is being loaded into the blister sheets. FIG. 1A-3 is a schematic depiction of a filling or dosing station where pills to fill the cavities are spread out and supplied through through hole channels 72 in the screen 71 for the filling of the respective blister packages 16 below. A pneumatic cylinder indexes a pill drop dosing plate automatically based on the indexing sequence of the blisters. The dosing plate can be mourned to linear rails on both sides with hard stops front and back. The dosing plate sits on the fixed, lower section of the dosing table, while the moveable upper section contains the dosing screen 71 and dosing tray 70 which can be raised and lowered to set the spacing of the dosing screen above the dosing plate for optimal dosing of different thicknesses of medicaments. A manual vertical adjustment permits the height of the upper screen 71 to be set relative to the pill drop screen for different pill sizes. Once set, a horizontal lock 73 secures the position.

As shown in FIG. 1A-1, foil material is supplied to blister packager 4. FIG. 1A-3 shows the filled blister packages 76 exiting to the right before the foil is overlaid on the blister packages. The foil material can be loaded manually by an operator for example onto an expandable mandrel driven by an electric motor. The clutch can turn on and off based on the position feedback from a dancer arm. When the clutch is off, the weight of the dancer arm pulls additional foil into the machine until the clutch turns on and stops the motion of the spindle. In one embodiment of the invention, the foil material is fed through a series of rollers and into a printer (e.g., a Domino printer). The printer prints the appropriate information 24 on the foil material, and then the foil material indexes towards blister seal station 10.

At blister seal station 10, the blister material and the printed foil material are heat sealed together to form a blister sheet. The two materials can be pressed together using pneumatic cylinders. Pressure for the pneumatic cylinders can be manually adjusted using a pressure regulator. Alternatively, the pressure can be automatically adjusted by a pressure controller in communication with a system control 50. The heat can be adjusted manually using a heater controller. The heat can be adjusted automatically by the system control 50. The sealing time is expected to be set manually.

As shown in FIG. 1A-1, a servo web feed advances the blister sheet through the blister packager 4. The lower roller of the servo feed may be made from a rubber roller that will grip the blister sheet between the blisters and on the ends of the blister sheet. The upper roller of the servo feed will apply spring pressure down on the lower roller to maintain consistent grip. The servo and gearbox can pull the material through the blister packager 4 with the index length verified by an encoder count. The index is adjustable.

As shown in FIG. 1A-1, a blister inspect station can inspect the formed blisters on the blister sheet with one or more cameras. For example, a top camera can inspect the printing on the blisters and read the barcodes to make sure they are readable using for example a Cognex DataMan barcode reader. A lower camera, also for example a Cognex In-Sight Micro, can view the blisters to insure pill presence, look for multiple pills in a blister, and look for broken pills. Once the blisters pass this station, the blisters can be labeled as pass or fail and tracked through the machine.

As shown in FIG. 1A-1, a blister die cut station cuts or punches the individual blisters from the blister sheet. The cutting die will index up using a pneumatic cylinder. Once the die has cut the blisters from the sheet, a secondary pneumatic actuator will hold the individual blisters with vacuum suction cups and lower the blisters down onto the cleated conveyor.

As shown in FIG. 1A-1, a scrap rewind pulls the excess material from the blister cut and wraps it onto a mandrel driven by an electric motor. The motor will turn on and off based on the position feedback from a dancer arm. The operator is responsible for removing the scrap material from the roll when it is full.

Figure 1B:
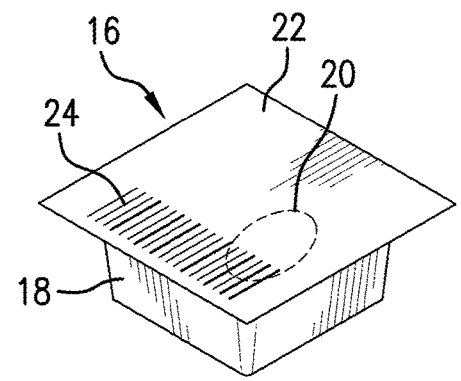
FIG. 1B is a schematic of a representative blister package handled by the present invention.
Figures 2, 2A:
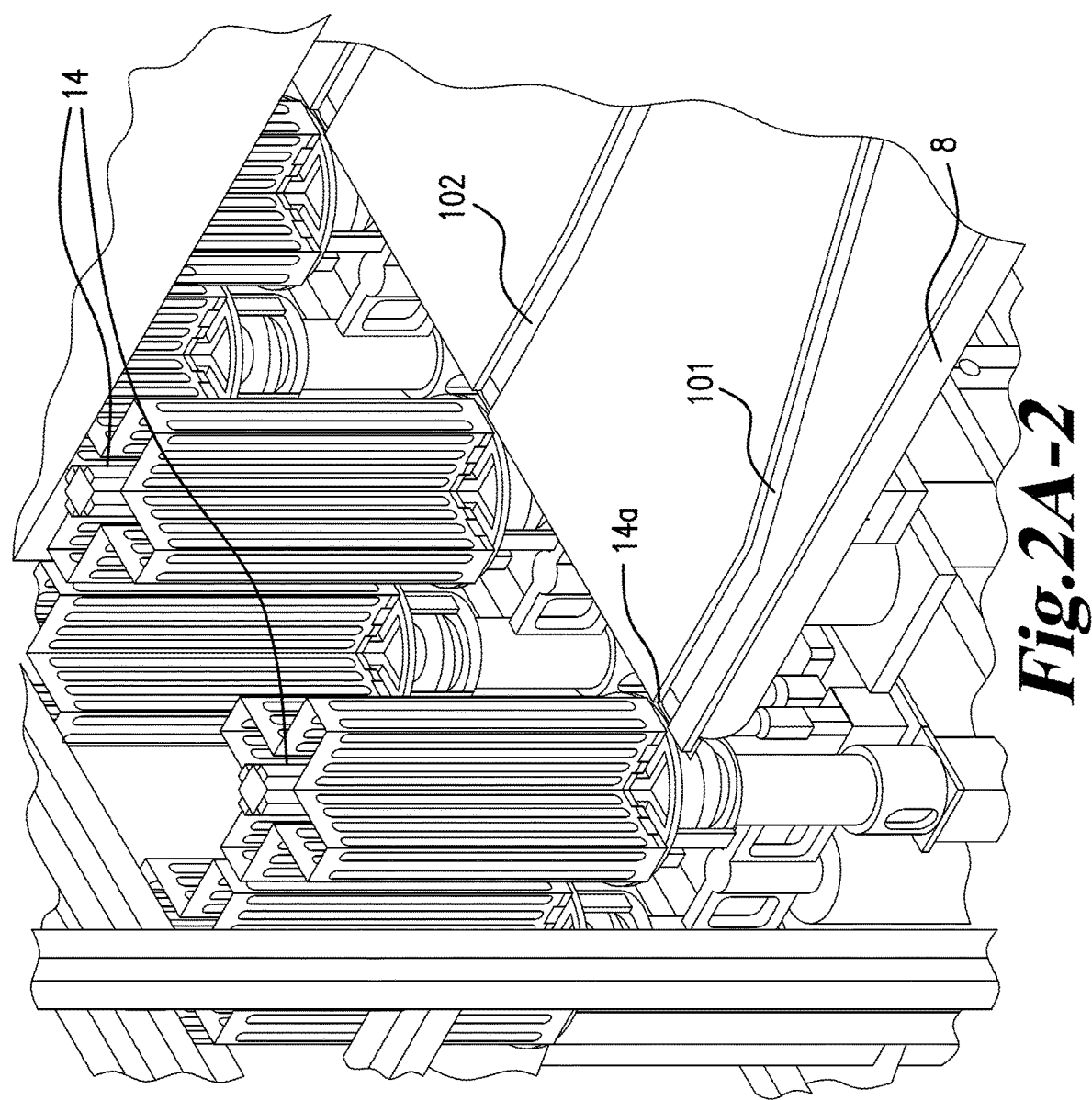

As shown in FIG. 1B, in one embodiment of the invention, the medications/supplements produced by blister packager 4 are provided in blisters 16 sized to receive an individual dose of a particular medication/supplement, commonly referred to as a blister pack. With reference to FIG. 1B, an exemplary blister 16 includes a base portion 18 defining the above-noted cavity for receiving the individual dose of the medication/supplement 20, and a generally planar closure 22 disposed over an open end of the base portion 18. In one embodiment of the invention, the peripheral dimensions of the blister capsule base portion 18 of the unit dose packages are smaller than the perimeter dimensions of the upper, generally planar closure 22 of the packages 16. This helps to limit the area that the tooling needs to contact to the blister packaging. The blisters 16 may be provided with information 24 related to the medication/supplement 20 contained in the packages 16, such as the name of the medication/supplement 20, the manufacturer, the date manufactured, the lot number, and/or other information, in the embodiment shown, information 24 is provided on the closure portion 22 and includes machine-readable information, such as a bar-code, that may be used to facilitate the automated storing, tracking, dispensing, and packaging of orders. FIG. 2A shows art example of a bar code reader 52 to read and verify the tube barcode and in turn associates the loaded blister to the tube. Blister barcodes are preferably read prior to the nest inlet 14a in FIG. 2A-2 (barcode reader not shown, see FIG. 6).

Figure 1C:
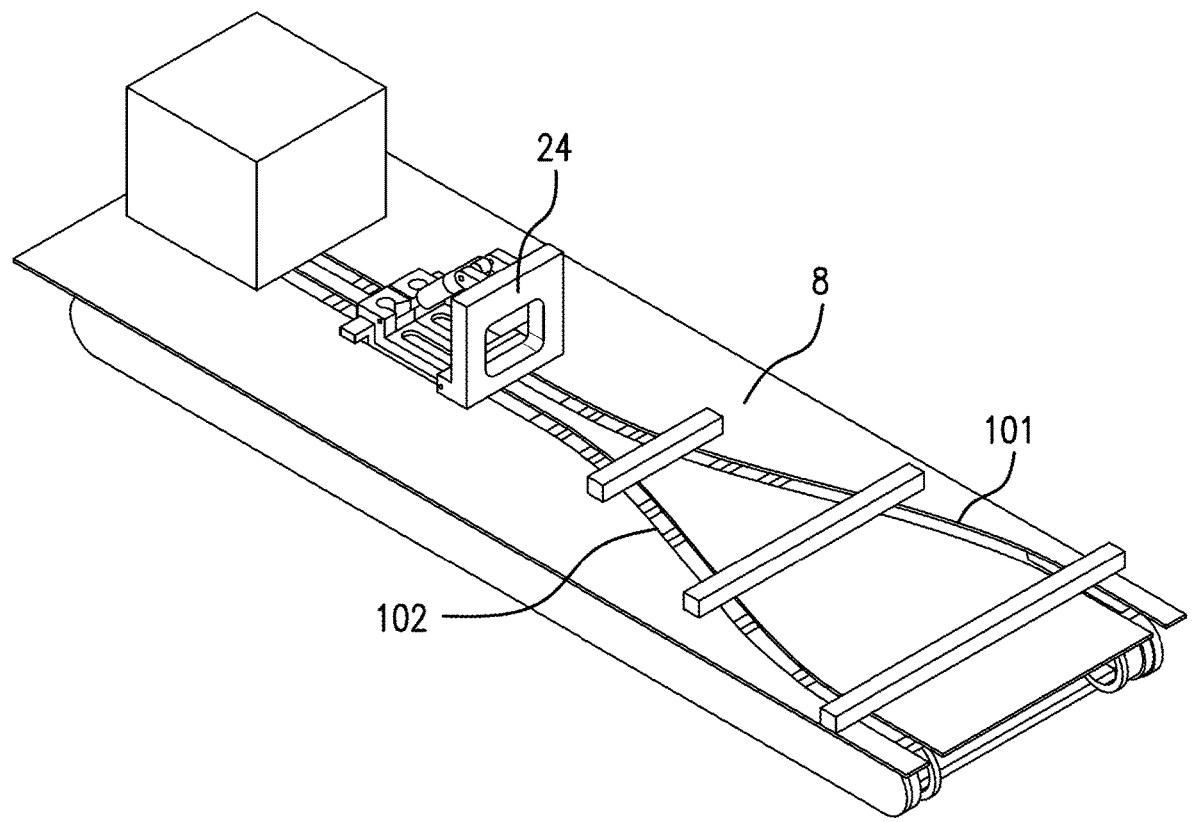
FIG. 1C is a schematic of a portion of a blister packager including a control gate to selectively select and direct blister packages.
Figure 1D:
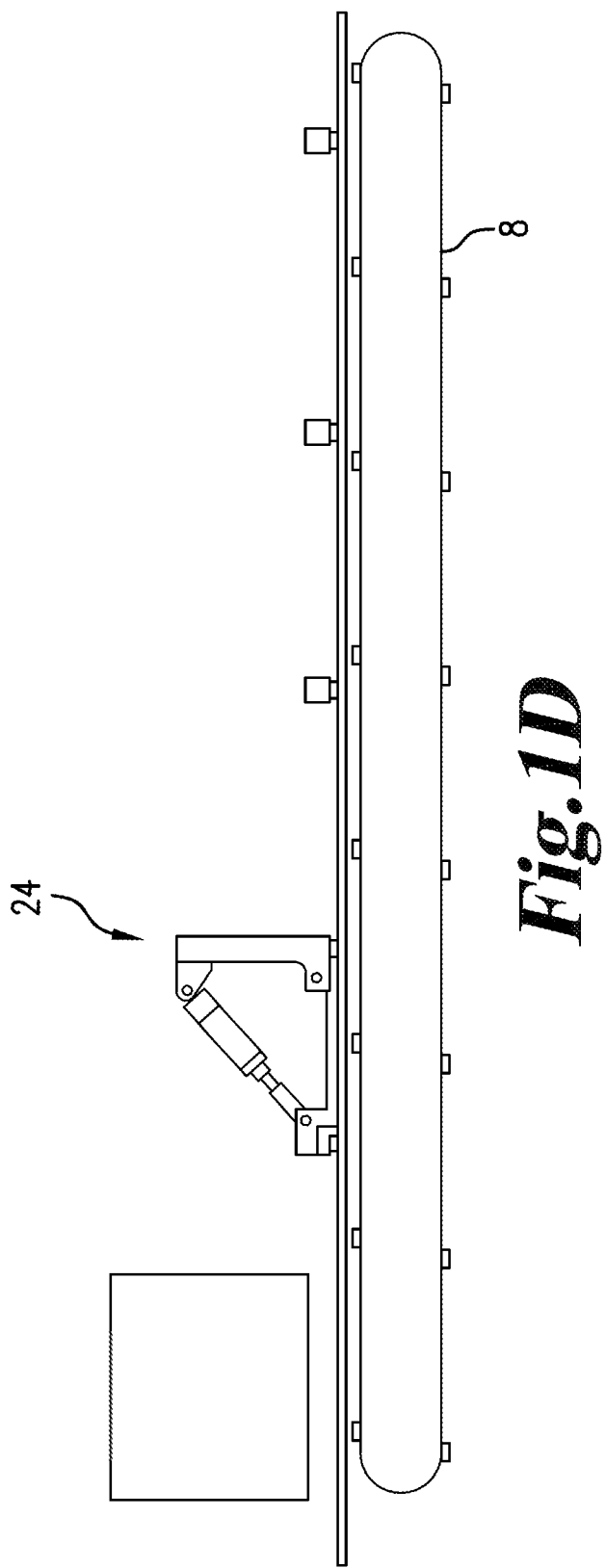
FIG. 1D is a cross sectional view of the blister packager shown in FIG. 1C.

In one embodiment of the invention, as shown in FIG. 1C, a pneumatic bridge (gate 24) is located after exiting the packager 4. In one embodiment of the invention, this bridge can be pneumatically activated with a spring return. In one embodiment of the invention, the bridge can be lowered when a known good blister is being indexed which will allow the good blisters to bypass the reject bin and travel to the blister stacker 6. FIG. 1D shows a perspective where the conveyor 8 is passing acceptable blisters 16 on toward the blister stacker 6. In one embodiment of the invention, the default position for this bridge is up. If a blister is not known to be good, the blister will fall into a reject bin during conveyor indexing forward.

In one embodiment of the invention, as shown in FIG. 1C, multiple tracks (e.g., see track 101 and track 102 on FIG. 1C) provide a way to transport blisters, in each track, to the stacker. Each track will be able to pass or reject a single blister with each index of the cleated conveyor and separate out acceptable from non-acceptable blisters 16. Accordingly, in one embodiment of the invention, a number of tracks (2, 3, 4, 5, tracks etc.) can be provided. In the embodiment, the bins are categorized with a first bin being for blisters that possibly have medications while a second bin is for known empty blisters. In one embodiment of the invention, a pneumatic rotating divider between the bins diverts the blisters as required per track (gate 24 in FIG. 1C and 1D).

In one embodiment of the invention, as shown in FIG. 1D, conveyor 8 is a servo indexing cleated conveyor that transports blisters from the punch die to the blister stacker 6. This conveyor can index approximately 6" each cycle, in one embodiment of the invention, blisters 16 from the blister packager 4 travel on a conveyor 8 segregated in two or more tracks or lanes, for example between 2-10 lanes, before arriving at respective blister-stacker 6. In one embodiment of the invention, rails are incorporated onto the conveyor to define the different tracks.

Figure 2B:
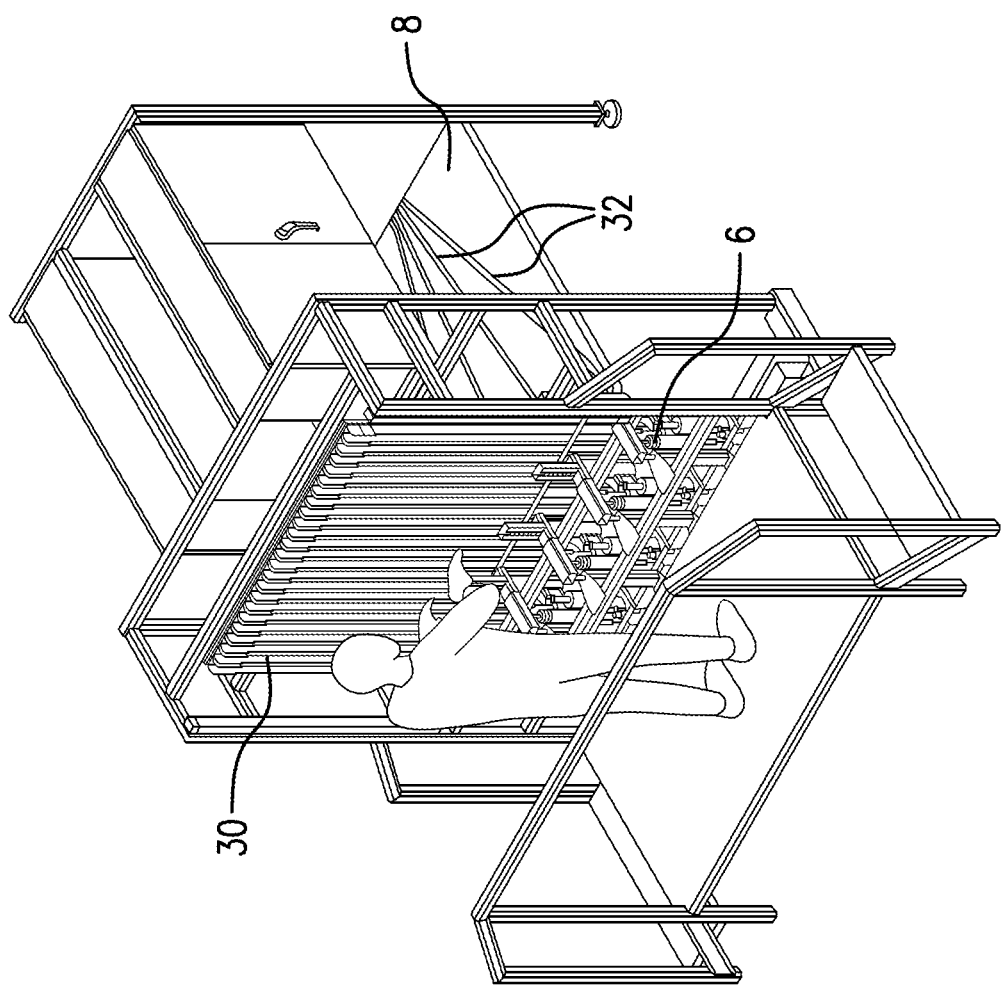
FIG. 2B is another schematic view of the conveyor and blister stacker shown in FIG. 2A-1.

As shown in FIGS. 2A-1 and 2B, guide rails 32 disposed above the surface of the conveyor 8 move and segregate the blisters 16 into different tracks or lanes. The rails 32 serve to segregate the blisters into multiple lanes (e.g., 2-10 lanes). In one embodiment of the invention, the rails 32 separate the centers of the lanes by a distance of 10-60 cm and preferably 30 cm. In one embodiment of the invention, as shown in, FIG. 2A-1, the blisters exit from conveyor 8 onto a nest inlet 14a under a collection tower 14.

The conveyor typically has a width ranging between 0.5 m and 5 m. The width of the conveyor is set according to the rate of blisters required. Conveyor can be approximately 36" wide. In one embodiment of the invention, a slip belt could be employed on the conveyor or a section of the conveyor versus the cleated conveyor. A slip belt permits the blisters to slide relative to the surface of the belt.

Blister Stacker

In one embodiment of the invention, blister-stacker 6 is capable of stacking up to 100 shallow blisters, 75 medium blisters or 75 deep blisters into each plug and play tube 30, for example in each of the tubes 30 shown in FIG. 2B. In one embodiment of the invention, the blister-stacker 6 can run at a rate of 300 ppm (75 ppm per lane to each blister stacker). This rate will be dependent on the rate in which the blisters are supplied from the blister packager 4.

Figure 3A:
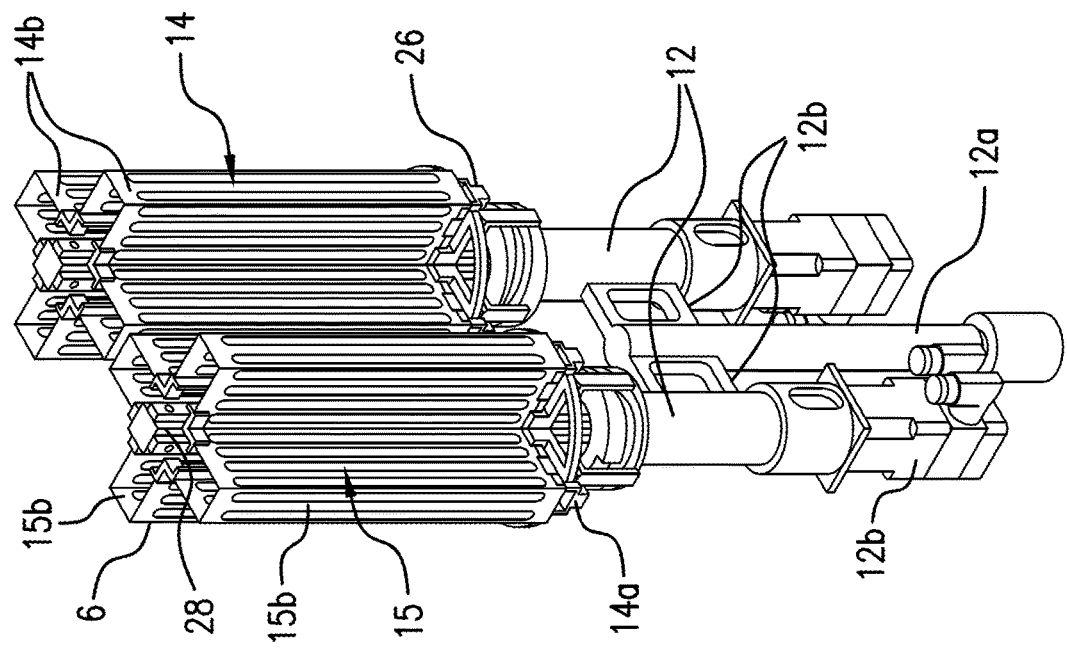
FIG. 3A is a schematic of a blister stacker according to one embodiment of the invention.

In one embodiment of the invention, as shown in FIG. 3A, each blister-stacker 6 includes multiple blister collection towers, e.g., one or more pairs of blister collection towers 14 and 15. In one embodiment of the invention, each blister stacker 6 has a pneumatic rotating cylinder 12a which permits the blister collation dial assemblies 12 (connected by rotatable arm 12b) to rotate about a vertical axis of the pneumatic rotating cylinder 12a to angular positions such that blister collection tower 14 (as shown in FIG. 3A) can be positioned with its nest assembly inlet 14a aligned to receive blisters 16 from the tracks tor from the conveyor) while blister collection tower 15 can be positioned adjacent the storage tubes 30. Both blister collection towers 14 and 15 in this example have 4 tower segments each, 14b and 15b. Blisters 16 stacked in collection towers 15 can be transferred into storage tubes 30.

Figure 3B:
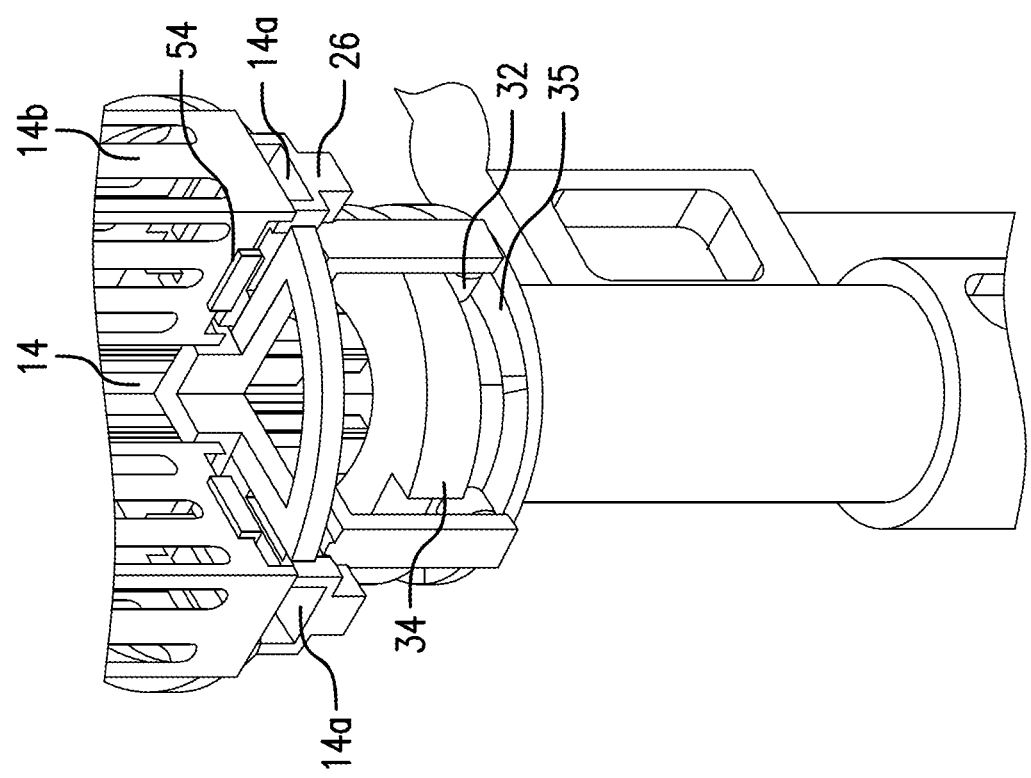
FIG. 3B is an enlarged schematic of the blister stacker shown in FIG. 3A.

FIG. 3B shows a close-up of a base of an exemplary collection tower 14. At the base of each tower section 14b is a blister opening 14a for receiving blisters from the conveyor. The nest assembly 26 is supported by a barrel cam 34 which has a cam follower 32 that travels with the barrel cam 34 as it rotates. The barrel cam and cam follower are raised during: rotation as they travel up incline 35. The movement up the incline in turn lifts the nest assembly 26 into each tower section 14b. As the nest assembly rises, the blister passes through gate 54. Once the blister has passed the gate 54, the gate will hold the blister in the tower and the nest assembly will be lowered to its original height as the barrel cam and cam follower travel down a decline. The nest assembly 26 will reach its original height by the time it arrives at its starting position where the blister entrance 14a is again ready to receive a blister from a conveyor track.

Figure 4:
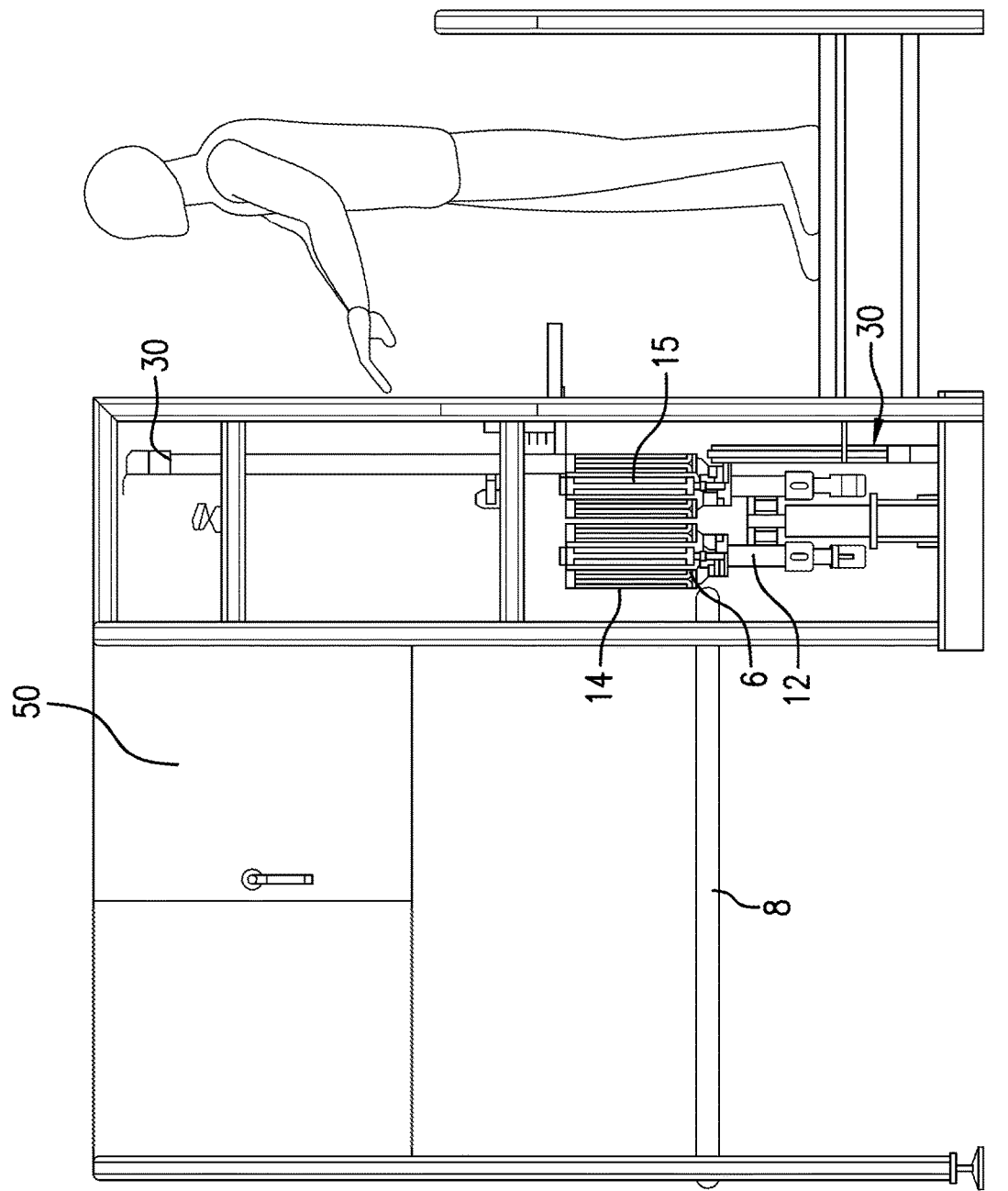
FIG. 4 is another schematic view of the blister stacker shown in FIG. 3A.

FIG. 4 shows a collection tower 14 in a first position for loading blister packages from the conveyor 8 and a second collection tower 15 in a second position for unloading a filled stack of the blister packages. The blister collation dial assembly 12 (once one tower is full) rotates to put an empty tower 14 into a position to be filled. Once the empty blister collation tower 14 is in position, the blisters resume travel on the conveyor 8 into the nest inlet 14a of the nest assembly 26. In one embodiment of the invention, an air assistance device can aid in the loading of individual blisters 16 into the nest inlet 14a. Alternatively, an overhead roller above the conveyor can drive or feed blister packs from conveyor into the dial nest assembly 14a or a cylinder pusher with a finger that sits behind the back edge of the blister for positive loading control of the blister into nest 14a.

In one embodiment of the invention, there is a pneumatic stop located at an entrance of the blister stacker 6. The pneumatic stop is used to stop any blisters from progressing after a blister coil bon tower 14 is fall. As shown in FIG. 3A, each blister collation dial assembly 12 may include four (4) blister collection tower sections 14b located 90 degrees apart. Each collection tower section is configured to accept shallow, medium or deep blisters with no change over. Each collection tower section 14b can be located at a fixed position above a nest assembly 26 on each blister collation dial 12.

In one embodiment of the invention, each collation dial assembly 12 has a servo 12c to rotate the collection towers and/or the nest Each nest assembly 26 can be made of for example, stainless steel. The nest assembly 26 can be mounted to a vertical rail 28 which may extend a full length of the storage tower 14.

Figure 7:
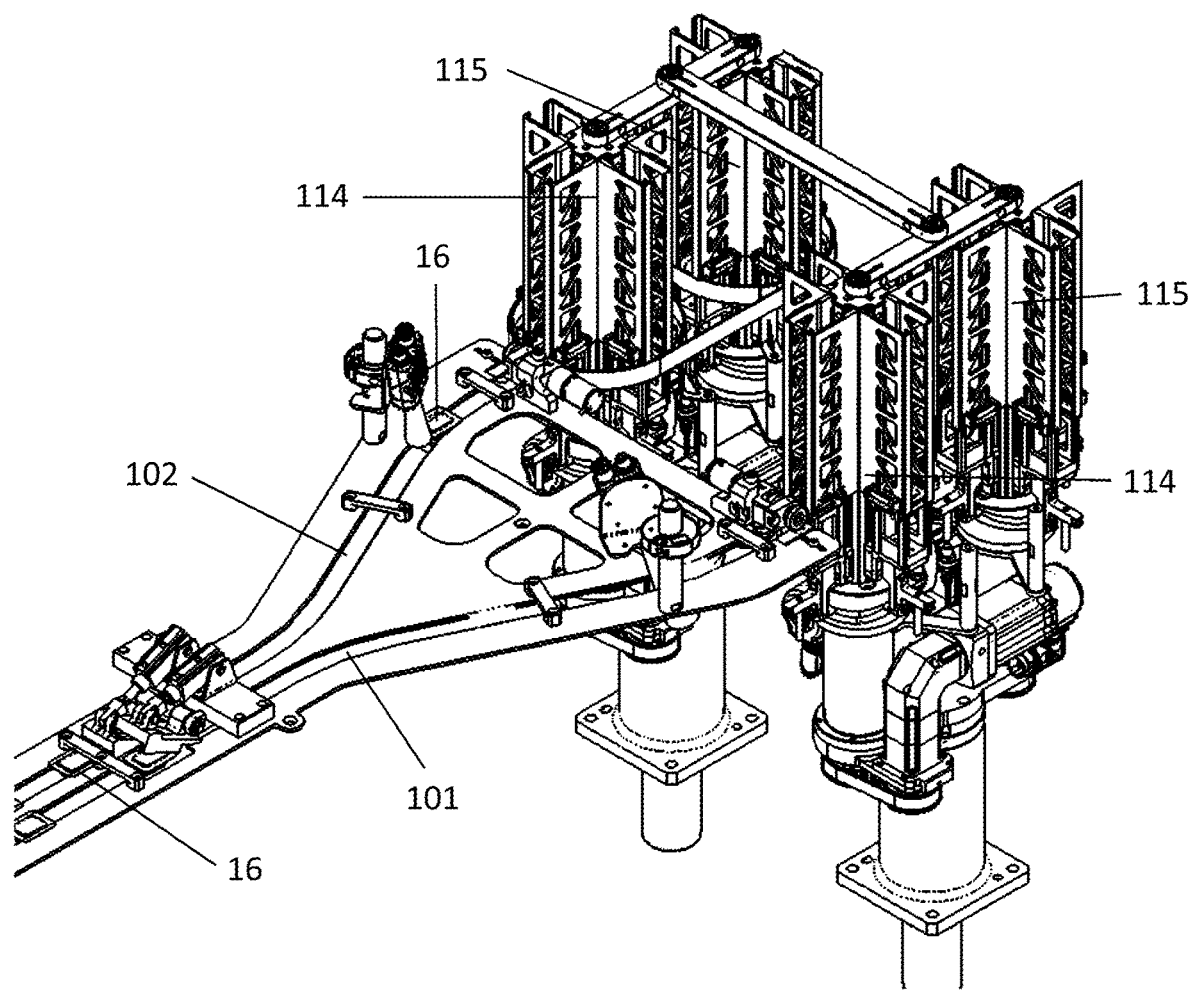
FIG. 7 is an overview of an embodiment of a cleated conveyor assembly and collation dials.

FIG. 7 is a general overview of an embodiment of a cleated conveyor assembly and stacking assembly 106 having two sets of stacking towers 114 and 115. Blisters 16 are supplied to each pair of stacking towers by a conveyor track 101, 102.

Figure 8A:
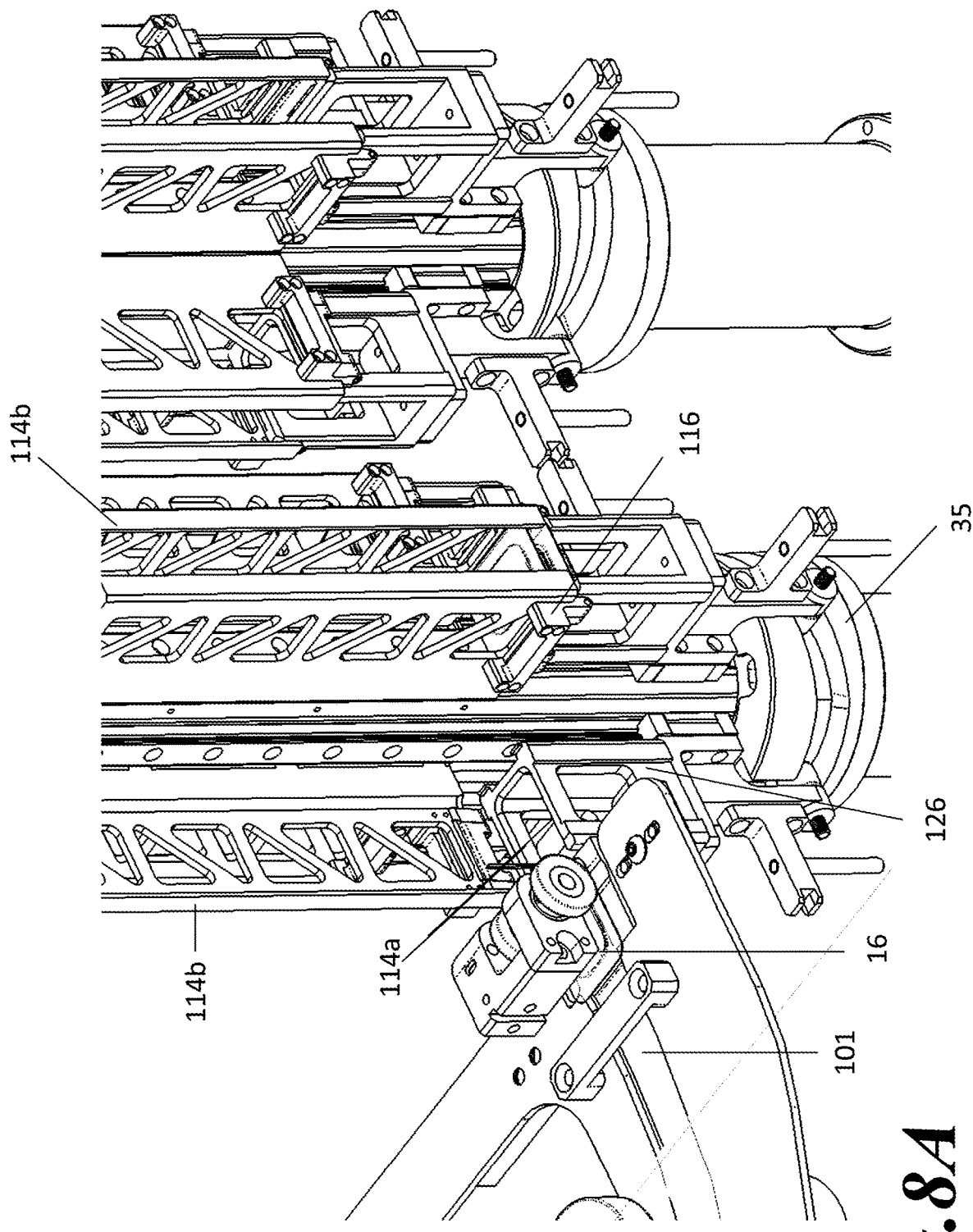
FIG. 8A is a schematic showing blisters as they are indexed along the cleated conveyor.

FIG. 8A shows the blisters as they are indexed along the cleated conveyor. The blister at the end of the conveyor track 102 is ready to enter into the collation dial nest The nest assembly 26 collects a single blister as it exits the conveyor 8 into the nest inlet 114a. As shown in FIG. 8A, in one embodiment the upper surface of the nest assembly which receives the blisters is U-shaped.

Figure 8B:
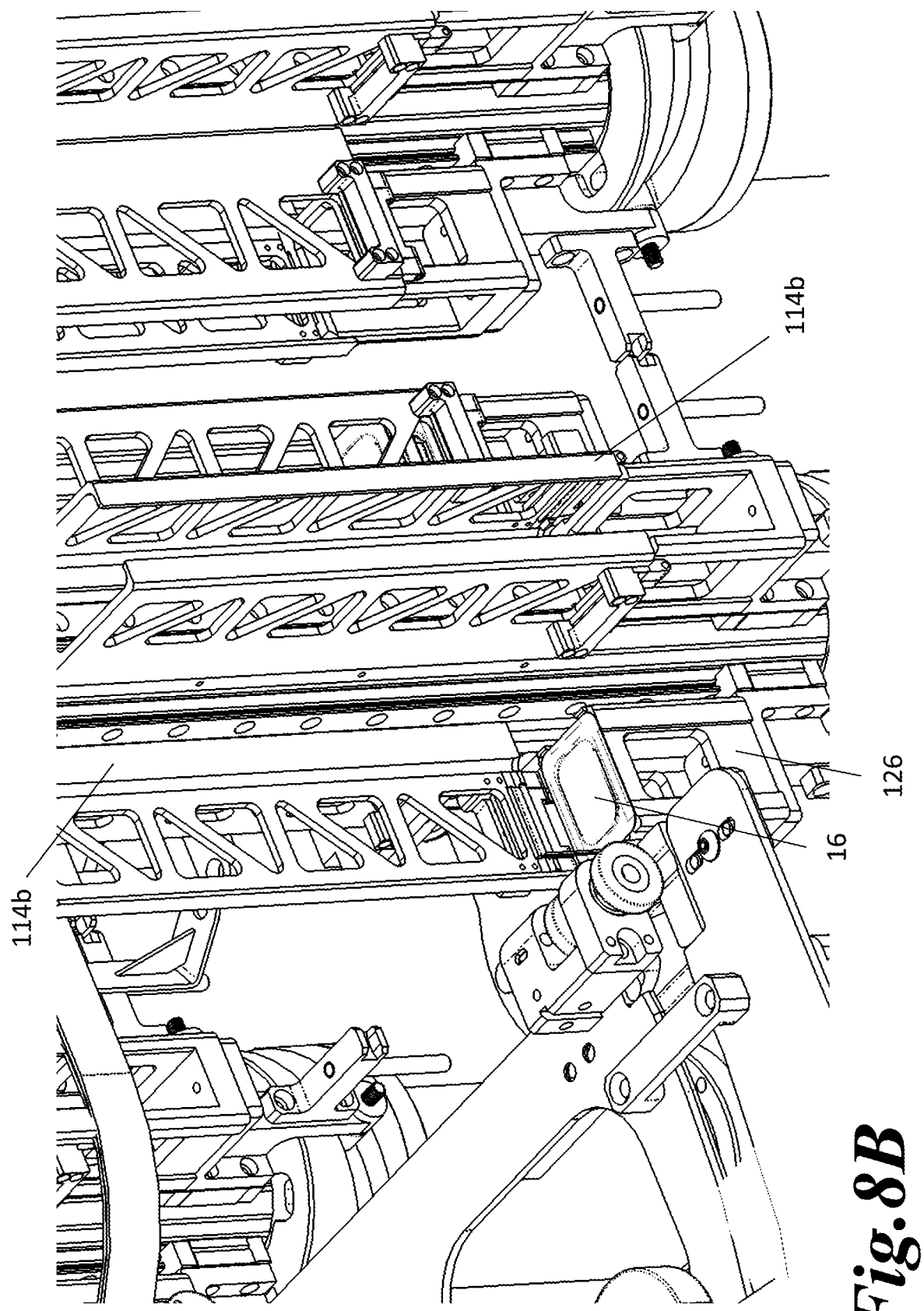
FIG. 8B is a schematic showing a blister in position in the collation dial nest prior to indexing of the collation dial.

FIG. 8B shows a blister 16 in position in the collation dial nest 126 below a blister tower section 114b, just prior to the index of the collation dial. A sensor (not shown) can detect when a blister has fully entered the nest 126 and is ready to rotate. As the dial rotates 90 degrees, the nest assembly (with blister 16) will be raised by the helical cam, which is internal to the nest 126 and starts to load the blister into the storage tower section 114*b*.

Figure 8C:
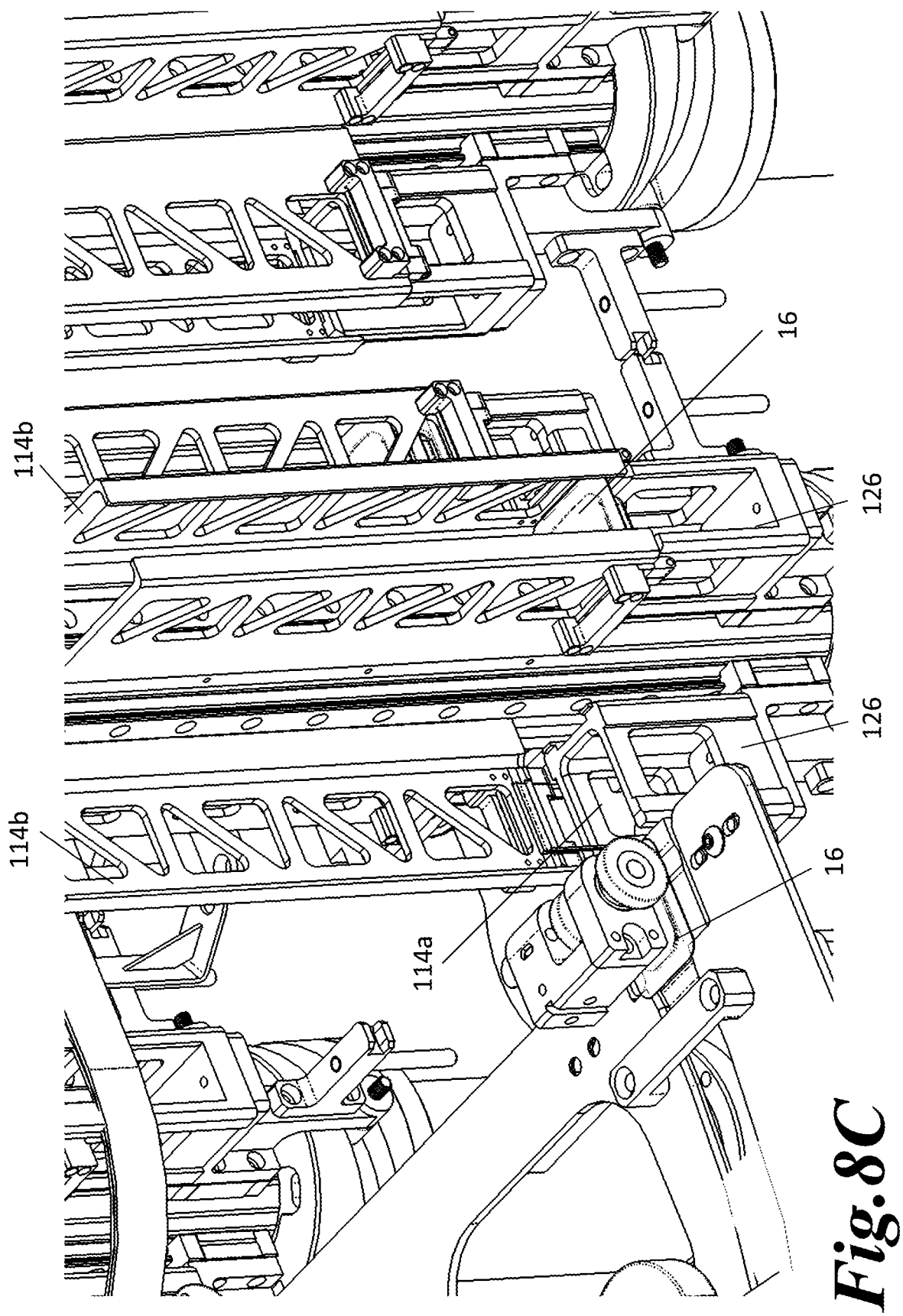
FIG. 8C is a schematic showing a blister in a nest after it has been indexed 90° the collation dial.

FIG. 8C shows the blister in the nest after it has been indexed 90° in the collation day. At this point one blister 16 is also starting to be raised into the stack tower section 114*b* via the incline 35 on the barrel cam.

Figure 8D:
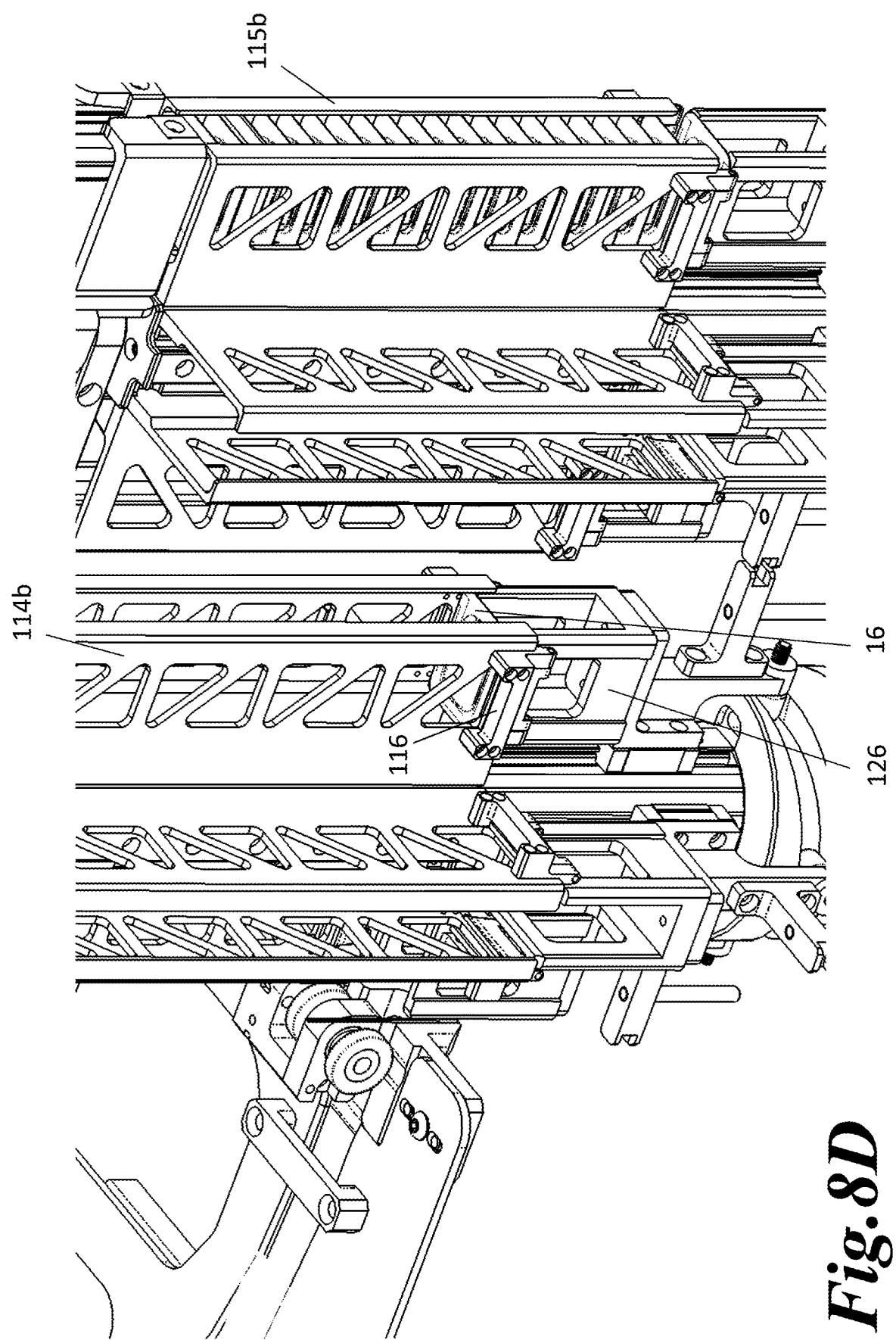
FIG. 8D is a schematic showing a blister completely raised into a tower section.

The nest assembly 126, after another 90 degree turn (180 degrees from start) will locate the blister at the top dead center of the cam. FIG. 8D shows the collation dial indexed another 90° so that the first blister 16 is 180° from the end of the conveyor. At this point the first blister has been completely raised into the stack tower section 114*b* and has been pushed past the spring loaded catches 116 located on either side of the stack tower section 114*b*. These spring loaded catches will support the blister as the blister nest 114*a* starts back down the barrel cam on the decline on the opposite side. The nest 114*a* will then be empty and ready for another blister to enter the nest. After releasing the blister 16, the dial rotates twice another 90 degrees and the nest 126 will be lowered back into the position where the load process started. At each index of the cleated conveyor a blister is inserted into the nest inlet 114*a* and before the next index the collation tower 114 rotates 90 degrees to move the next blister inlet 114*a* into position for the cleated conveyor to insert the next blister. In one embodiment of the invention, a 360 degree cycle is used for each full cycle. Accordingly, there are different embodiments for the order of inserting blister packs. The packs may be inserted sequentially in each of the four tower sections, the blister packs may be inserted serially in one tower until that tower is full or partially full, the blister packs can be inserted on a schedule between one tower and another tower or tower section. A mixed sequence can be used if different products are to be collectively grouped together.

In a preferred embodiment, each blister collection tower has four tower sections 14*b* shown in FIG. 3A. However, each tower may have 2, 3, 5, 6, or other number of tower sections 14*b* with corresponding nests 14*a* under each section. Preferably, the tower sections are evenly spaced (angularly and/or physically) around a perimeter of the tower section.

In one embodiment of the invention, a first group of collection towers 14 (e.g., all four collections towers) can rotate while the blisters are loaded into the towers 14 from four separate tracks. In another embodiment, the system has two tracks with two receiving towers 14. The blisters may ride up an incline, driven through the barrel cam, to push the blister into one of the towers. This procedure pushes the blister packs upward into the collection tower section. The upward motion moves the blister pack against gravity. In this embodiment, gravity and air resistance mays act against the blister pack to hold the blister pack's orientation during loading, permitting higher rates of packs to be pushed without compromise of the stack integrity. In one embodiment of the invention, sequential blisters ride up the incline and are pushed into one or more of the towers 14. In another embodiment of the invention, sequential blisters ride up the incline and are pushed into adjacent towers. When a collection tower 14 is full, rotatable arm 12*b* switches the first collection tower 14 to an offload position (where the blisters can be unloaded from the tower 14 into the plug and play tubes 30) and a second collection tower 15 (empty) is rotated into the loading position.

The tower sections 14*b* are configured in such a way as to have as few contact points with the blisters as possible to reduce drag on the blisters. The profile for the plug and play tubes 30 can accommodate this configuration. For example, each storage tower section 14*b* can be configured to accommodate up to 20 shallow, 17 medium blisters or 15 deep blisters with no change over. The towers and tower sections may be made of aluminum or other suitable material. In one embodiment of the invention, there is a flip gate 54 at the bottom of each tower section 14*b* to prevent the blisters from falling out the bottom once the blisters have been placed in the tower section 14*b*.

Figure 9:
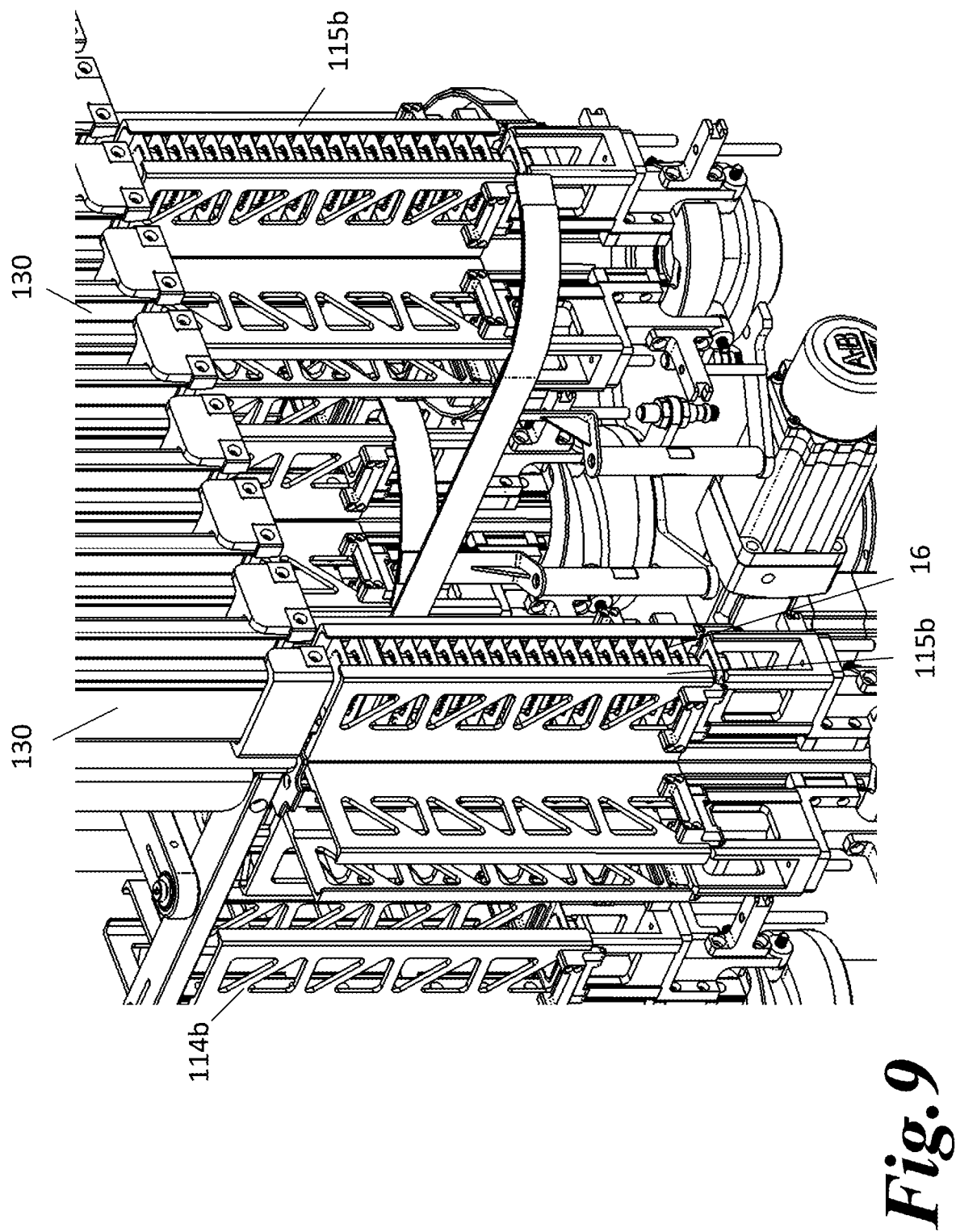
FIG. 9 is a schematic showing a full stack of blisters ready to be loaded into a tube.

FIG. 9 shows fully stacked tower sections 115*b* section ready to be loaded into the magazine tubes 130. This is accomplished via an electric actuator mounted below the blister nest. The actuator will lift the blister nest through an opening in the barrel cat and this will then push all the blisters up into the magazine tube 130.

In one embodiment of the invention, once the towers 14 are full, the cleated conveyor will stop indexing to the filling position. The full collation dial assembly will be changed out for empty one using the pneumatic rotary actuator to tip rotate the full set of collection towers 14 as the collation dial assembly 12 is rotated around rotatable arm 12*b*. Once the empty collation dial 12 is moved into position, the indexing conveyor is activated to allow blisters to continue to be stacked in empty towers 15 while the full collation dial is loaded into the plug and play tubes 30.

Plug and Play Tube Load Station

Figure 5:
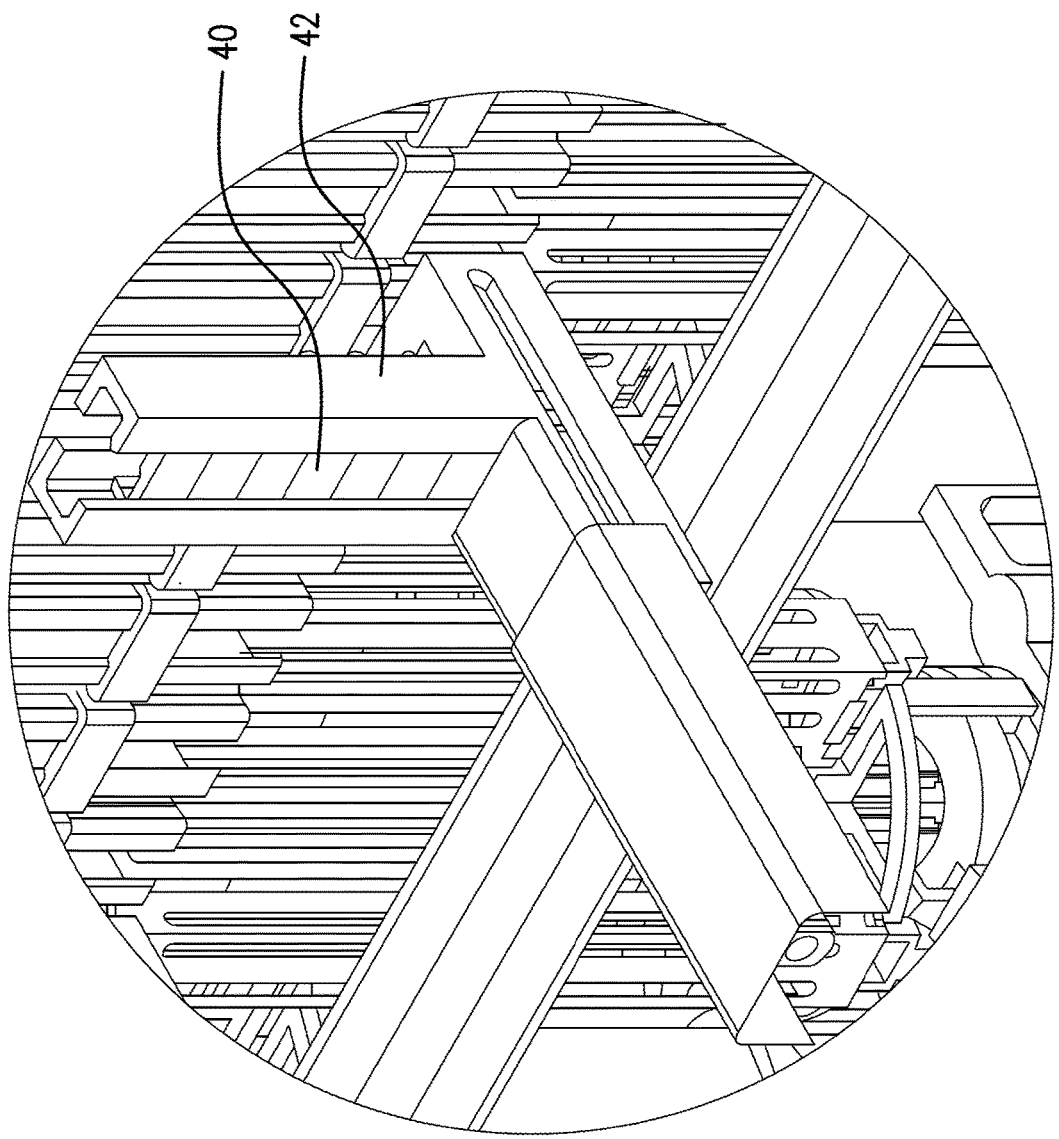
FIG. 5 is a schematic of a magazine containing clips for sealing the storage tubes once all of the blister packages are stacked therein.

FIG. 4 is a schematic showing a servo 12 that has a cylinder which pushes blisters 16 from the collection towers 14 of blister stacker 6 up into plug and play tubes 30. In one embodiment of the invention, a total of twenty-four (24) plug and play tubes 30 are loaded (6 per each of the four collation dial assemblies). The plug and play tubes 30 will be loaded onto a linear servo slide. In one embodiment of the invention, the blister-stacker 6 loads four or more tubes 30 concurrently. Once the tubes 30 (or any 1 of the tubes) are filled, a servo slide will move the filed tube over (e.g., over 5.0 cm,) which will move a set of empty plug and play tubes 30 into position to be filled. The filled tubes may then be utilized in storage modules such as those discussed in US Pat. Appl. Publ. No. 2010/0176145. The caps will not be required to be removed. The operator may simply load the tubes 30, attach the top using the slot in the cap, and place a clip 40 from a magazine 42 onto tube 30. In one embodiment of the invention, as shown in FIG. 5, there is a magazine 42 located in front of each tube 30 at the blister load stations (4 total) This will allow the blister-stacking system o automatically insert clip 40 onto each tube 30 after it is filled.

In a preferred embodiment the storage tubes are separate from the collection towers, as explained in more detail below. Nevertheless, in one embodiment, the storage tubes could be accommodated on/with the collection towers so that a loading of a collection tower in effect loaded a storage tube. However, with the storage tubes separate from the collection towers, the process of loading the tubes is separated from the ongoing tower loading meaning that there need not be any interruption of the conveyor and product delivery and individual blister pack stacking while the storage tubes are tilled and secured.

Figure 6:
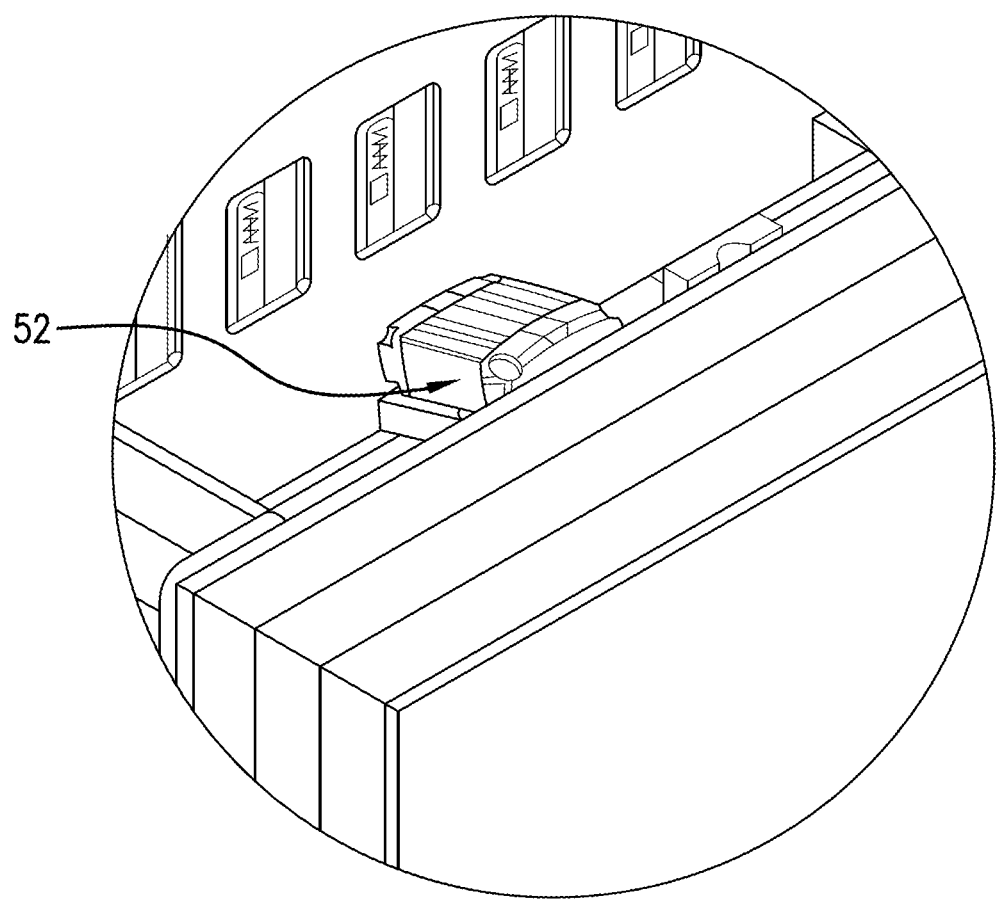
FIG. 6 is a schematic of a bar code reader implementation.

In one embodiment of the invention, as shown in FIGS. 2A-1 and 6 there is a bar code reader 52 located at each tube load station (e.g., at four total load station). The bar code reader 52 can read the bar code prior to any blisters being loaded into the tubes. If a bar code is not read, the module will alert the operator or the control system of the blister-stack system.

In one embodiment of the invention, there is a light curtain located at both ends of the tube station. The light curtain permits an operator to change tubes at any time but will not allow the servo slide to move tubes while an operator is inside the light curtain.

While blisters are loaded from towers into tubes in a preferred embodiment, the blisters could be loaded into sleeves, cartridges, magazines, or other suitable storage container which can be utilized by a later device to dispense the blisters.

Controls

In one embodiment of the invention, the blister-collation system includes system control 50 (as noted above). The system control includes power, sensor, and communication networks, including for example power distribution, programmable logic control, power supplies, sensors, and safety relays. In one embodiment of the invention, the control system is machine control system having for example an Allen Bradley Compact Logix with Ethernet communication and an Allen-Bradley Panelview Plus 7" color touch screen HMI to control all normal functions of the blister-stacking system. A managed Ethernet switch will be provide for communication to the machine. Ethernet network with an open port available for connection to a customer network. Servo controls will utilize Allen-Bradley Kinetix 350 drives with Ethernet. Pneumatic controls will utilize SMC pneumatic manifolds with Ethernet communication (Ex250 series) and remote I/O modules. Push buttons preferably control the important functions of the blister-stacking system. A stack light will be provided with an audible alarm and machine status indication.

The blister-collation system control system, in one embodiment is equipped with an Emergency Power Off (EPO) safety circuit. This circuit removes all potential energy from the system with the exception of PLC power, low power indicator circuits and Communication power. This circuit is used for serious emergency conditions where there is an immediate danger of injury or equipment damage. An adequate amount of E-Stop push buttons will be provided to ensure the safe operation of the machine.

In one embodiment of the invention, guard doors have hard wired power to unlock safety interlock switches to provide safe entry into the components of the blister-stacking system. In one embodiment of the invention, all machine motion is interrupted until all guard doors are securely shut.

Figure 10:
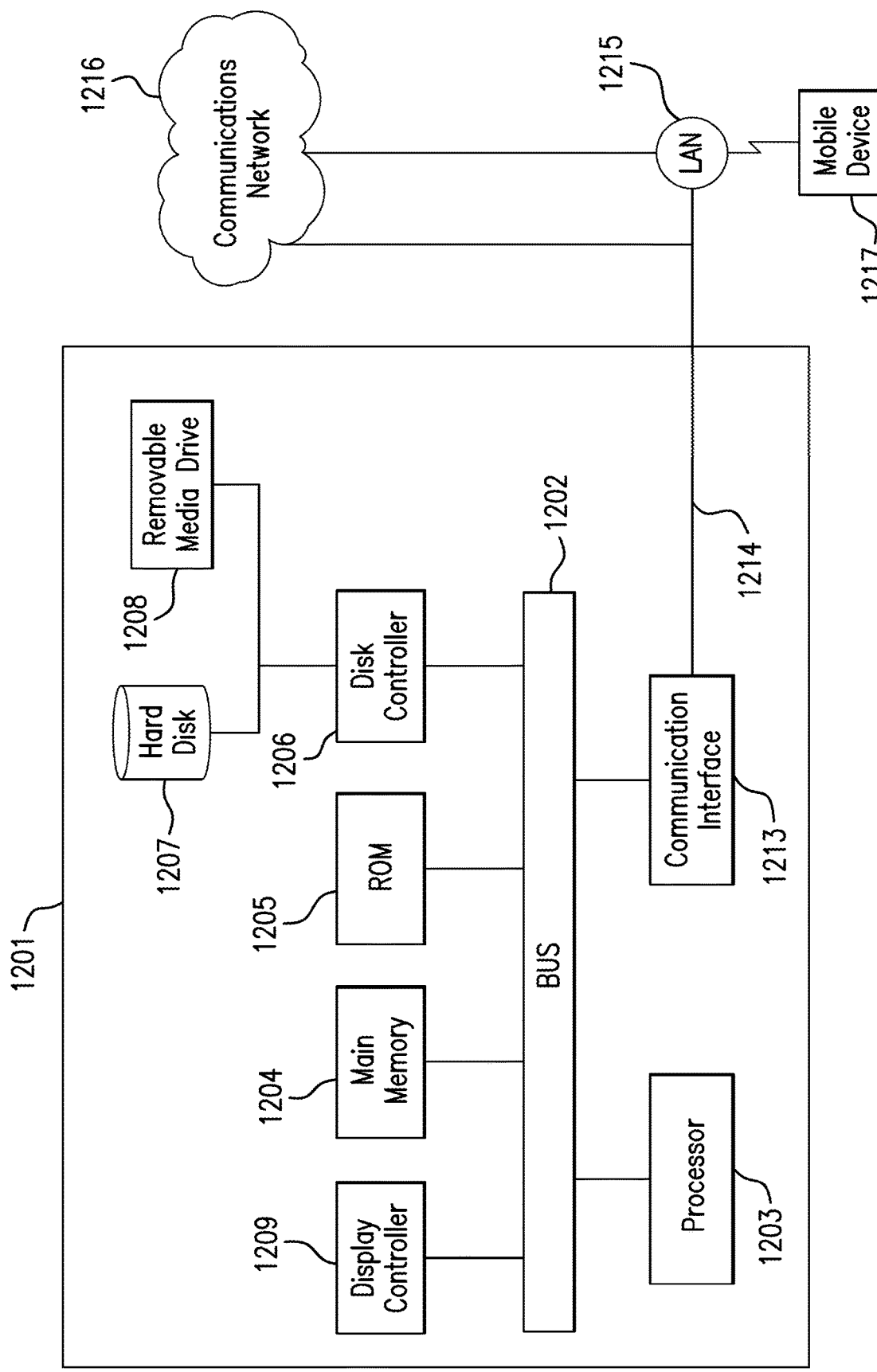
FIG. 10 is a schematic depicting an exemplary computer system for implementing various embodiments of the invention.

FIG. 10 illustrates a computer system 1201 for implementing various embodiments of the invention. The computer system 1201 may be used as system control 50 to perform any or all of the functions described above. The computer system 1201 includes a bus 1202 or other communication mechanism for communicating information, and a processor 1203 coupled with the bus 1202 for processing the information. The computer system 1201 also includes a main memo, 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device programmable read only memory (PROM), erasable PROM (EPROM), and electrically erasable PROM (EEPROM)) coupled to the bus 1202 for storing static information and it instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc chive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display, such as a cathode ray tube (CRT), for displaying information to a computer user. The computer system includes input devices, such as a keyboard and a pointing device, for interacting with a computer user (e.g., an operator) and providing information to the processor 1203. The pointing device, for example, may be a mouse, a trackball, or a pointing stick for communicating direction information and command selections to the processor 1203 and for controlling cursor movement on the display. In addition, a printer may provide printed listings of data stored and/or generated by the computer system 1201.

The computer system 1201 performs a portion or all of the processing steps of the invention (such as for example those described in relation to blister packaging and stacking) in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM SRAM, SDRAM, or any other magnetic medium, compact discs CD-ROM), or any other optical medium, punch cards, paper tape, or other physical medium with patterns of holes, a carrier wave (described below , or any other medium from which a computer can read.

Stored on any one or on a combination of computer readable media, the invention includes software for controlling the computer system 1201, for driving a device or devices for implementing the invention, and for enabling the computer system 1201 to interact with a human user. Such software may include, but is not limited to, device drivers, operating systems, development tools, and applications software. Such computer readable media further includes the computer program product of the invention for performing all or a portion (if processing is distributed) of the processing performed in implementing the invention.

The computer code devices of the invention may be any interpretable or executable code mechanism, including but not limited to scripts, interpretable programs, dynamic link libraries (DLLs), Java classes, and complete executable programs. Moreover, parts of the processing of the invention may be distributed for better performance, reliability, and or cost. The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover the network link 1214 may provide a connection through a LAN 1215 to a mobile device 1217 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

Generalized Statements of the Inventions

The following statements provide one or more characterizations of the present inventions and do not limit the scope of those inventions.

Statement 1. A blister collation system comprising:
a blister packager including a blister seal station which seals a blister package with a medicament inside;
a blister package stacker connected to the blister packager via a conveyor which moves individual blister packages;
said blister package stacker having a nest inlet for reception of the blister packages from the conveyor, a nest assembly for holding one of the blister packages, and a first blister package collection tower for storing a stack of the blister packages, wherein the nest assembly is configured to insert one blister package at a time upward into a bottom of the first collection tower;
a tower gate holding the inserted blister packages; and
a mechanism for pushing the stack of the blister packages from the first collection tower into a storage container.

Statement 2. The system of statement 1, wherein the nest assembly is configured to rotate and raise for insertion the blister packages into the stack of the first collection tower.

Statement 3. The system of any of statements 1-2, wherein the nest assembly, upon rotation, raises vertically said one of the blister packages into the stack.

Statement 4. The system of statement 3, wherein the nest assembly is connected by a cam follower to a barrel cam driving said rotation and raising the nest assembly.

Statement 5. The system of any of statements 1-4, wherein the tower gate comprises a flip gate at a bottom thereof to prevent the blister packages from falling out once the blisters have been placed in the collection tower.

Statement 6. The system of any of statements 1-5, further comprising a second collection tower, wherein the first and second collection towers are each disposed on a rotatable arm.

Statement 7. The system of statement 6, wherein the first collection tower comprises four collection tower sections disposed in separate quadrants, each collection tower section having an associated blister inlet and nest assembly.

Statement 8. The system of any of statements 6-7, further comprising a rotatable cylinder, wherein the first and second collection towers are disposed at opposite ends of the rotatable arm and the rotatable cylinder is connected to a center of the rotatable arm.

Statement 9. The system of any of statements 6-8, wherein the rotatable arm rotates the first and the second collection towers between a first position where the blister packages are loaded into at least one of the collection towers and a second position where the stack of blister packages filled in said at least one of the collection towers is unloaded into at least one storage tube.

Statement 10. The system of any of statements 1-9, wherein the storage containers are storage tubes and the tubes index to positions over the stack in the collection tower.

Statement 11. The system of any of statements 1-10, wherein the blister package stacker flintier comprises a bar code reader for identifying the medicament inside the blister packages.

Statement 12. The system of any of statements 1-11, wherein the blister packager comprises an inspection station which inspects the blister packages for improper filling.

Statement 13. The system of statement 12, wherein the blister packager comprises a control gate for directing improperly tiled blister packages away from the blister stacker.

Statement 14. The system of any of statements 1-13, wherein the conveyor has rails mounted above a belt of the conveyor, said rails forming tracks for movement of the blister packages in predetermined directions.

Statement 15 The system of statement. 14, wherein said belt has cleats for engaging with and pushing the blister packages toward the blister stacker.

Statement 16. The system of any of statements 1-15, further comprising a magazine of clips for sealing the storage tube once the stack of the blister packages has been inserted into the storage tube.

Statement 17. The system of any of statements 1-16, wherein the collection tower holds the stack of the blister packages at selected contact positions on a periphery of each of the blister packages.

Statement 18, The system of any of statements 1-17, wherein the nest comprises a stainless steel material.

Statement 19. The system of any of statements 1-18, wherein the tower comprises an anodized aluminum material.

Statement 20. The system of any of statements 1-19, wherein the mechanism for pushing comprises a push arm connected to a servo cylinder.

Statement 21. The system of any of statements 1-20, further comprising a transfer assistance device for transference of the blister packages from the conveyor to the nest.

Statement 22. The system of any of statements 1-21, further comprising a controller which executes one or more of the following:
receive a first sensor signal indicating that the blister package is loaded in the nest and transmit a first control signal to rotate dial and raise the nest;
receive a second sensor signal indicating that the collection tower is completely full and transmit a second control signal to push the stack of blister packages into one of the storage tubes;
receive a third sensor signal indicating that the conveyor is full of the blister packages and transmit a third control signal to stop production of the blister packages; and
receive a fourth sensor signal including information on the medicament in the blister packages in the storage tubes and store said information.

Statement 23. A blister package stacker for reception and stacking of blister packages containing an item, comprising:
a nest inlet for reception of the blister packages from a conveyor;
a nest assembly for holding one of the blister packages;
a blister package collection tower section for storing a stack of the blister packages, wherein the nest assembly is configured to insert one blister package at a time upward into a bottom of the blister package collection tower section; and
a tower gate holding the inserted blister packages,
wherein the blister package collection tower section comprises a part of a rotatable first blister collection tower.

Statement 24. The stacker of statement 23, wherein the nest assembly is configured to rotate and raise for insertion one of the blister packages into the stack of the blister package collection tower section.

Statement 25 The stacker of any of statements 23-24, wherein the nest assembly, upon rotation, raises vertically said one of the blister packages into the stack.

Statement 26. The stacker of statement 25, wherein the nest assembly is connected by a cam follower to a barrel cam driving said rotation and raising the nest assembly, Statement 27. The stacker of any of statements 23-26, wherein the tower gate comprises a flip gate at a bottom thereof to prevent the blister packages from falling out once the blisters have been placed in the tower section.

Statement 28, The stacker of any of statements 23-27, further comprising a second blister collection tower, wherein the first and second collection towers are disposed on a rotatable arm.

Statement 29. The stacker of statement 28, wherein the first and second collection towers each comprise four collection tower sections disposed in separate quadrants.

Statement 30. The stacker of statement 28, further comprising a rotatable cylinder, wherein the first and the second collection towers are disposed at opposite ends of the rotatable arm and the rotatable cylinder is connected to a center of the rotatable arm.

Statement 31. The stacker of statement 30, wherein the rotatable arm rotates the first and second collection towers between a first position where the blister packages are loaded into at least one of the collection towers and a second position where the stack of blister packages filled in said at least one of the collection towers is unloaded into at least one storage tube.

Statement 32. The stacker of statement 31, wherein the storage tubes index to positions over the stack in the collection tower section.

Statement 33. The stacker of any of statements 23-32, wherein the stacker further comprises a bat code reader for identifying the item inside the blister packages.

Statement 34. The stacker of any of statements 31-33, further comprising a magazine of clips for sealing the storage tube once the stack of the blister packages has been inserted into the storage tube.

Statement 35. The stacker of any of statements 23-34, wherein the collection tower section holds the stack of the blister packages at selected contact positions on a periphery of each of the blister packages.

Statement 36. The stacker of any of statements 23-35, wherein the nest comprises a stainless steel material.

Statement 37 The stacker of any of statements 23-36, wherein the tower section comprises an anodized aluminum material.

Statement 38. The stacker of any of statements 23-37, further comprising a push arm which pushes the stack of the blister packages from the collection tower section into storage tubes, wherein the push arm is connected to a servo cylinder.

Statement 39. The stacker of any of statements 23-38, further comprising a controller which executes one or more of the following:
receive a first sensor signal indicating that the blister package is loaded in the nest and transmit a first control signal to rotate dial and raise the nest;
receive a second sensor signal indicating that die collection tower section is completely full and transmit a second control signal to push the stack of blister packages into a storage tube;
receive a third sensor signal indicating that a blister tower is full of the blister packages and transmit a third control signal to stop production of the blister packages; and
receive a fourth sensor signal including information on the item in the blister packages in the storage tubes and store said information.

Statement 40. A control system for a blister collation system, comprising:
a non-transitory computer readable medium which, when executed by a processor, performs one or more of the following,
receive a first sensor signal indicating that a blister package is loaded on a nest assembly of a blister package stacker, and transmit a first control signal to raise the nest assembly into a collection tower,
receive a second sensor signal indicating that the collection tower is completely full and transmit a second control signal to push a stack of blister packages into a storage tube, receive a third sensor signal indicating that a conveyor is full of the blister packages and transmit a third control signal to stop production of the blister packages, and receive a fourth sensor signal including information on the medicament in the blister packages in the blister package and store the information.

Statement 41. A method for forming packages of blister packages, comprising:
sealing a blister package with an item inside;
moving the blister packages on a conveyor toward a blister package stacker;
receiving the blister packages one at a time in a nest inlet of the blister package stacker and holding the received blister package in a nest assembly;
inserting one blister package at a time into a bottom of a blister package collection tower section by upward movement of the blister;
retaining the inserted package in the blister package collection tower section; and
repeating said receiving, inserting, and retaining to form a stack of the blister packages in the blister package collection tower section.

Statement 42. Me method of statement 41, further comprising pushing the stack of the blister packages from the blister package collection tower into storage tubes.

Statement 43. The method of any of statements 41-42, wherein said inserting one blister package at a time comprises rotating and raising the nest assembly vertically for insertion of said one of the blister packages into the stack of the blister package collection tower section.

Statement 44. The method of any of statements 41-43, farther comprising loading a first set of the blister packages into a first blister package collection tower while unloading a second set of the blister packages from a second blister package collection tower.

Statement 45. The method of any of statements 41-44, wherein the unloading of the blister packages is into a storage tube.

Statement 46. The method of statement 45, further comprising indexing the storage tubes to positions over the stack in the collection tower section.

Statement 47. The method of any of statements 41-46, further comprising identifying the item inside the blister packages with a bar code reader.

Statement 48, The method of any of statements 41-47, further comprising inspecting the blister packages on the conveyor for improper filling.

Statement 49. The method of any of statements 41-48, further comprising directing improperly filled blister packages away from the blister stacker.

Statement 50. The method of any of statements 41-49, wherein the item is a medicament.

The invention claimed is:

1. A blister collation system comprising:
a blister packager including a blister seal station which seals a blister package with a medicament inside;
a blister package stacker connected to the blister packager via a conveyor which moves individual blister packages;
said blister package stacker having a nest inlet for reception of the blister packages from the conveyor, a nest assembly for holding one of the blister packages, and a first blister package collection tower for storing a stack of the blister packages, wherein the nest assembly is configured to insert one blister package at a time upward into a bottom of the first collection tower;
a tower gate holding the inserted blister packages; and
a mechanism for pushing the stack of the blister packages from the first collection tower into a storage container.

2. The system of claim 1, wherein the nest assembly is configured to rotate and raise for insertion the blister packages into the stack of the first collection tower.

3. The system of claim 1, wherein the nest assembly, upon rotation, raises vertically said one of the blister packages into the stack.

4. The system of claim 3, wherein the nest assembly is connected by a cam follower to a barrel cam driving said rotation and raising the nest assembly.

5. The system of claim 1, wherein the tower gate comprises a flip gate at a bottom thereof to prevent the blister packages from falling out once the blisters have been placed in the collection tower.

6. The system of claim 1, further comprising a second collection tower, wherein the first and second collection towers are each disposed on a rotatable arm.

7. The system of claim 6, wherein the first collection tower comprises four collection tower sections disposed in separate quadrants, each collection tower section having an associated blister inlet and nest assembly.

8. The system of claim 6, further comprising a rotatable cylinder, wherein the first and second collection towers are disposed at opposite ends of the rotatable arm and the rotatable cylinder is connected to a center of the rotatable arm.

9. The system of claim 6, wherein the rotatable arm rotates the first and the second collection towers between a first position where the blister packages are loaded into at least one of the collection towers and a second position where the stack of blister packages filled in said at least one of the collection towers is unloaded into at least one storage tube.

10. The system of claim 1, wherein the storage containers are storage tubes and the tubes index to positions over the stack in the collection tower.

11. The system of claim 1, wherein the blister package stacker further comprises a bar code reader for identifying the medicament inside the blister packages.

12. The system of claim 1, wherein the blister packager comprises an inspection station which inspects the blister packages for improper filling.

13. The system of claim 12, wherein the blister packager comprises a control gate for directing improperly filled blister packages away from the blister stacker.

14. The system of claim 1, wherein the conveyor has rails mounted above a belt of the conveyor, said rails forming tracks for movement of the blister packages in predetermined directions.

15. The system of claim 14, wherein said belt has cleats for engaging with and pushing the blister packages toward the blister stacker.

16. The system of claim 1, further comprising a magazine of clips for sealing the storage tube once the stack of the blister packages has been inserted into the storage tube.

17. The system of claim 1, wherein the collection tower holds the stack of the blister packages at selected contact positions on a periphery of each of the blister packages.

18. The system of claim 1, wherein the nest comprises a stainless steel material.

19. The system of claim 1, wherein the tower comprises an anodized aluminum material.

20. The system of claim 1, wherein the mechanism for pushing comprises a push arm connected to a servo cylinder.

21. The system of claim 1, wherein the collection tower comprises a plurality of collection tower sections, each section configured to hold a stack of blister packages, and each collection tower section having an associated blister inlet and nest assembly.

* * * * *